(12) United States Patent
Kawada et al.

(10) Patent No.: US 12,420,471 B2
(45) Date of Patent: Sep. 23, 2025

(54) FORMING SYSTEM AND FORMING METHOD

(71) Applicant: HONDA MOTOR CO., LTD., Tokyo (JP)

(72) Inventors: Yuki Kawada, Tokyo (JP); Junya Yamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 18/176,391

(22) Filed: Feb. 28, 2023

(65) Prior Publication Data
US 2023/0294349 A1    Sep. 21, 2023

(30) Foreign Application Priority Data

Mar. 16, 2022    (CN) .......................... 202210260016.0

(51) Int. Cl.
| | | |
|---|---|---|
| *B29C 51/32* | (2006.01) | |
| *B29C 51/08* | (2006.01) | |
| *B29C 51/14* | (2006.01) | |
| *B29C 51/44* | (2006.01) | |

(52) U.S. Cl.
CPC ............ *B29C 51/32* (2013.01); *B29C 51/082* (2013.01); *B29C 51/14* (2013.01); *B29C 51/445* (2013.01); *B29C 2793/0009* (2013.01)

(58) Field of Classification Search
CPC ..................................................... B29C 51/32
See application file for complete search history.

(56) References Cited

U.S. PATENT DOCUMENTS

| | | | | |
|---|---|---|---|---|
| 3,655,320 A | * | 4/1972 | Heavener ................ | B29C 51/00 264/550 |
| 5,393,474 A | * | 2/1995 | Souders ................... | B29C 51/32 264/316 |
| 6,056,531 A | * | 5/2000 | Furuya .................... | B29C 51/08 264/154 |

(Continued)

FOREIGN PATENT DOCUMENTS

| | | |
|---|---|---|
| CN | 113226699 A | 8/2021 |
| JP | S57133019 A | 8/1982 |

(Continued)

OTHER PUBLICATIONS

Notification of Reasons for Refusal issued Jul. 2, 2024 in the JP Patent Application No. 2023-029557.

(Continued)

*Primary Examiner* — Atul P. Khare
(74) *Attorney, Agent, or Firm* — CKC & Partners Co., LLC

(57) ABSTRACT

A forming system includes a trim blade 7 for cutting off a sheet material 2 provided between a lower die 60 and an upper die 66, a first lower plate 81 provided outside a first lower die end 60a in a side view of the lower die 60, and a first upper plate 85 provided outside an upper die end 66a, configured to reciprocatively move together with the upper die 66 and extending toward the first lower plate 81. A cut plane of the blade 7 intersects a first excess edge portion 25 which is a portion of the sheet material 2 outside the lower die end 60a, and at least a portion of the excess edge portion 25 is sandwiched between the first lower plate 81 and the first upper plate 85 in a state in which the lower die 60 and the upper die 66 are clamped.

11 Claims, 19 Drawing Sheets

(56) References Cited

U.S. PATENT DOCUMENTS

| | | | |
|---|---|---|---|
| 2010/0270698 A1 | 10/2010 | Seger | |
| 2019/0084213 A1 | 3/2019 | Arahata et al. | |
| 2021/0245417 A1* | 8/2021 | Arahata | B29C 51/10 |
| 2022/0063174 A1 | 3/2022 | Arahata et al. | |

FOREIGN PATENT DOCUMENTS

| | | | |
|---|---|---|---|
| JP | 2005297301 A | 10/2005 |
| WO | 2020138340 A1 | 7/2020 |

OTHER PUBLICATIONS

Office Action issued Jul. 16, 2025 in the CN Patent Application No. 202210260016.0.

\* cited by examiner

FORMING SYSTEM AND FORMING METHOD

This application is based on and claims the benefit of priority from Chinese Patent Application No. 202210260016.0, filed on 16 Mar. 2022, the content of which is incorporated herein by reference.

BACKGROUND OF THE INVENTION

Field of the Invention

The present invention relates to a forming system and a forming method. In particular, the present invention relates to a forming system and a forming method in which a lower die and an upper die provided on either side of a sheet material are clamped together, the sheet material is cut with a trim blade, and a product is formed.

Related Art

A known method for forming a skin of an instrument panel for a vehicle by forming a resin sheet material includes heating the sheet material, stretching the sheet material further, and using vacuum forming to adhere the sheet material to a base material of the instrument panel (see PCT International Publication No. WO2020/138340 by the present applicant, for example).

In the method disclosed in Patent Document 1, a sheet material is gripped by a gripping frame, the sheet material is heated by a heating device, the sheet material is disposed between a lower die on which a base material is placed in advance and an upper die, and further, the lower die and the upper die are clamped together to adhere the sheet material to the base material.

Patent Document 1: PCT International Publication No. WO2020/138340

SUMMARY OF THE INVENTION

In the forming method disclosed in PCT International Publication No. WO2020/138340, two lower die surfaces having the same shape are formed on one lower die, and two products having the same shape are manufactured from one sheet of the sheet material. However, in PCT International Publication No. WO2020/138340, the step of cutting off the sheet material into the two products, which is performed after the step of clamping together the lower die and the upper die, has not been sufficiently discussed. In such a case, to shorten the cycle time required to manufacture a product and simplify a device, the sheet material is preferably cut off with a trim blade provided in the same device when the lower die and the upper die are clamped together to form the product.

FIG. 17 is a diagram schematically illustrating a forming device 100 provided with a trim blade 104 for cutting a sheet material 103 after a lower die 101 and an upper die 102 are clamped together, in the forming device disclosed in PCT International Publication No. WO2020/138340.

As mentioned above, in the forming device disclosed in PCT International Publication No. WO2020/138340, it is necessary to grip end portions of the sheet material 103 by the gripping frame before the lower die 101 and the upper die 102 are clamped together. For this reason, the sheet material 103 has an excess edge portion 103a, which protrudes from a die end 105 of the lower die 101 and the upper die 102 in a side view. When the trim blade 104 provided to the upper die 102 is lowered, the excess edge portion 103a escapes downward as illustrated in FIG. 17, which may cause cutting failure.

The present invention is directed at providing a forming system and a forming method that can appropriately cut off a sheet material including an excess edge portion protruding from a die end.

(1) A forming system (e.g., a forming system 1, described below) according to the present invention includes: a lower die (e.g., a lower die 60, described below); an upper die (e.g., an upper die 66, described below) reciprocatively movable toward and away from the lower die; a trim blade (e.g., a trim blade 7, described below) for cutting off a sheet material (e.g., a sheet material 2, described below) provided between the lower die and the upper die; a lower plate (e.g., a first lower plate 81 and a second lower plate 91, described below) provided outside a lower die end (e.g., a first lower die end 60a and a second lower die end 60b, described below) in a side view of the lower die and extending toward the upper die; and an upper plate (e.g., a first upper plate 85 and a second upper plate 95, described below) provided outside an upper die end (e.g., a first upper die end 66a, described below) in a side view of the upper die, configured to reciprocatively move together with the upper die and extending toward the lower plate. A cut plane (e.g., a cut plane 71, described below) of the trim blade intersects an excess edge portion (e.g., a first excess edge portion 25 and a second excess edge portion 26, described below) which is a portion of the sheet material outside the lower die end, and at least a portion of the excess edge portion is sandwiched between the lower plate and the upper plate in a state in which the lower die and the upper die are clamped together.

(2) In this case, preferably, a slit-shaped lower guide portion (e.g., a first lower guide portion 83, described below) and a slit-shaped upper guide portion (e.g., a first upper guide portion 87, described below) extending along the cut plane are formed in the lower plate and the upper plate, respectively, and the trim blade cuts off the excess edge portion by moving in the lower guide portion and the upper guide portion.

(3) In this case, preferably, the lower die includes a first lower die surface (e.g., a first lower die surface 61a, described below) on which a first base material (e.g., a first base material 63, described below) is placed, and a second lower die surface (e.g., a second lower die surface 62a, described below) on which a second base material (e.g., a second base material 64, described below) is placed, and each of the first and second base materials is adhered to the sheet material by clamping together the lower die and the upper die. The trim blade cuts off the sheet material between the first lower die surface and the second lower die surface in plan view to thereby divide the sheet material into a first product portion to which the first base material is adhered and a second product portion to which the second base material is adhered.

(4) In this case, preferably, a frame body (e.g., a gripping frame 30, described below) is further provided, the frame body being for gripping at least a portion of an edge side (e.g., edge sides 25a, 26a, described below) of the sheet material such that the lower plate and the upper plate are located inside the edge side in plan view between the lower die and the upper die.

(5) A forming method according to the present invention is a method for forming a product by clamping together a lower die (e.g., the lower die 60, described below) and an upper die (e.g., the upper die 66, described below) between which a sheet material (e.g., the sheet material 2, described below) is disposed and cutting off the sheet material with a trim blade (e.g., the trim blade 7, described below). The method includes: a forming step (e.g., step S3 in FIG. 12, described below) including disposing the sheet material between the lower die and the upper die and clamping together the lower die and the upper die; and a cutting step (e.g., step S4 in FIG. 12, described below) including cutting off the sheet material by moving the trim blade after the lower die and the upper die are clamped together. In the cutting step, the sheet material is cut off in a state in which at least a portion of an excess edge portion (e.g., the first excess edge portion 25 and the second excess edge portion 26, described below) is positioned in such a manner as to intersect a cut place of the trim blade, the excess edge portion being a portion of the sheet material outside a lower die end (e.g., a first lower die end 60*a* and a second lower die end 60*b*, described below) in a side view of the lower die.

(6) In this case, preferably, in the cutting step, the excess edge portion is positioned by sandwiching at least a portion of the excess edge portion between a lower plate (e.g., the first lower plate 81 and the second lower plate 91, described below) and an upper plate (e.g., the first upper plate 85 and the second upper plate 95, described below), the lower plate being provided outside the lower die end and extending toward the upper die, the upper plate being provided outside an upper die end (e.g., the first upper die end 66*a*, described below) in a side view of the upper die, being configured to reciprocatively move together with the upper die and extending toward the lower plate.

(7) In this case, preferably, in the forming step, a first base material (e.g., the first base material 63, described below) and a second base material (e.g., the second base material 64, described below) are adhered to the sheet material by clamping together the lower die and the upper die in a state in which the first base material and the second base material are placed on a first lower die surface (e.g., the first lower die surface 61*a*, described below) and a second lower die surface (e.g., the second lower die surface 62*a*, described below) formed on the lower die, respectively, and in the cutting step, the sheet material is cut between the first lower die surface and the second lower die surface in plan view, thereby dividing the sheet material into a first product portion to which the first base material is adhered and a second product portion to which the second base material is adhered.

(8) In this case, preferably, in the forming step, the lower die and the upper die are clamped together in a state in which an edge side of the sheet material is gripped by a frame body (e.g., the gripping frame 30, described below) such that the lower plate and the upper plate are located inside the edge side in plan view between the lower die and the upper die.

(1) The forming system according to the present invention includes the trim blade for cutting off the sheet material, the lower plate provided outside the lower die end in a side view of the lower die and extending toward the upper die, and the upper plate provided outside the upper die end in a side view of the upper die, configured to reciprocatively move together with the upper die and extending toward the lower plate. In the forming system according to the present invention, the cut plane of the trim blade (i.e., a plane formed by the cutting edge of the trim blade when the trim blade is moved within a movable range) intersects the excess edge portion of the sheet material, and at least a portion of the excess edge portion is positioned by being sandwiched between the lower plate and the upper plate in a state in which the lower die and the upper die are clamped together. According to the present invention, when the trim blade is moved within the movable range, the excess edge portion of the sheet material can be prevented from escaping outward of the cut plane of the trim blade, which makes it possible to prevent cutting failure of the sheet material.

(2) In the forming system according to the present invention, by positioning the excess edge portion of the sheet material by the lower plate and the upper plate having the slit-shaped lower guide portion and the slit-shaped upper guide portion that extend along the cut plane of the trim blade, the excess edge portion can be reliably prevented from escaping outward of the cut plane when the trim blade is moved, which makes it possible to reliably prevent the cutting failure of the sheet material.

(3) According to the forming system according to the present invention, by cutting off a portion including the excess edge portion of the sheet material by the trim blade in a state in which at least a portion of the excess edge portion of the sheet material is positioned by the lower plate and the upper plate, the sheet material can be divided into the first product portion to which the first base material is adhered and the second product portion to which the second base material is adhered.

(4) According to the forming system according to the present invention, by gripping at least a portion of the edge side of the sheet material by the gripping body such that the lower plate and the upper plate are located inside the edge side of the sheet material in plan view between the lower die and the upper die, a portion of the excess edge portion of the sheet material can be reliably sandwiched between the lower plate and the upper plate when the lower die and the upper die are clamped together. Thus, the excess edge portion of the sheet material can be reliably prevented from escaping outward of the cut plane of the trim blade when the trim blade is moved within the movable range, which makes it possible to reliably prevent the cutting failure of the sheet material.

(5) The forming method according to the present invention includes the forming step including disposing the sheet material between the lower die and the upper die and clamping together the lower die and the upper die; and the cutting step including cutting off the sheet material by moving the trim blade after the lower die and the upper die are clamped together. According to the present invention, in the cutting step, the sheet material is cut off in a state in which the excess edge portion of the sheet material is positioned in such a manner as to intersect the cut plan of the trim blade. According to the present invention, when the trim blade is moved within the movable range, the excess edge portion of the sheet material can be prevented from escaping outward of the cut plane of the trim blade, which makes it possible to prevent cutting failure of the sheet material.

(6) In the forming method according to the present invention, by positioning the excess edge portion of the sheet material by sandwiching the sheet material between the lower plate and the upper plate that extend in the direction in which the the upper die reciprocatively moves, the excess edge portion can be reliably prevented from escaping outward of the cut plane when the trim blade is moved, which makes it possible to reliably prevent the cutting failure of the sheet material.

(7) According to the forming method of the present invention, by cutting off a portion including the excess edge portion of the sheet material by the trim blade in a state in which at least a portion of the excess edge portion of the sheet material is positioned, the sheet material can be divided into the first product portion to which the first base material is adhered and the second product portion to which the second base material is adhered.

(8) According to the forming method of the present invention, by gripping at least a portion of the edge side of the sheet material by the frame body such that the lower plate and the upper plate are located inside the edge side of the sheet material in plan view between the lower die and the upper die, a portion of the excess edge portion of the sheet material can be reliably sandwiched between the lower plate and the upper plate when the lower die and the upper die are clamped together. Thus, the excess edge portion of the sheet material can be reliably prevented from escaping outward of the cut plane of the trim blade when the trim blade is moved within the movable range, which makes it possible to reliably prevent the cutting failure of the sheet material.

DETAILED DESCRIPTION OF THE INVENTION

A configuration of a forming system in which a forming method according to an embodiment of the present invention is used will be described below with reference to the drawings. A forming system 1 and a forming method using the forming system 1 correspond to a device and a method for manufacturing a product (an instrument panel for a vehicle) by forming a sheet material (for example, made of resin) and adhering the sheet material as a skin on a base material of an instrument panel of a vehicle.

Figure 1:
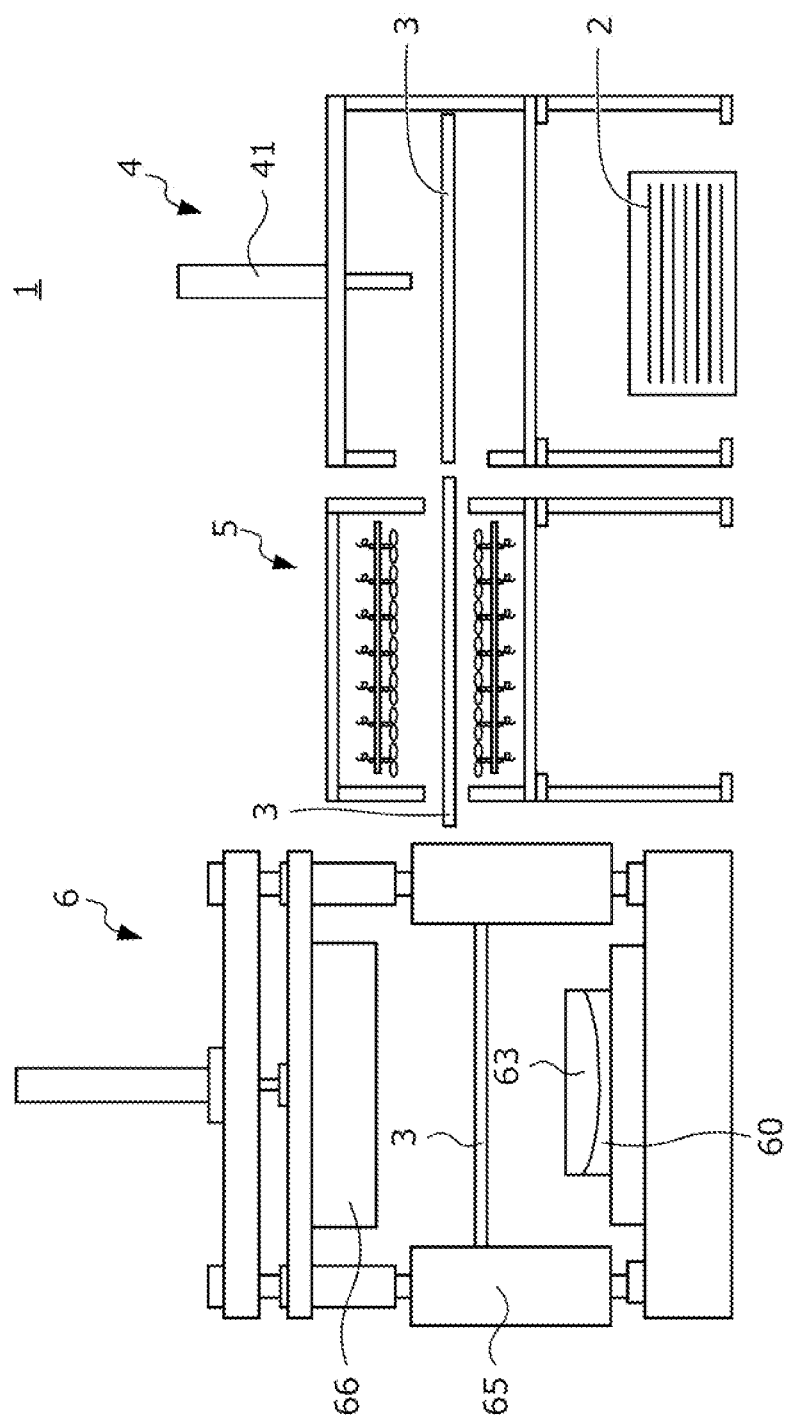
FIG. 1 is a diagram schematically illustrating the configuration of a forming system in which a forming method according to an embodiment of the present invention is used.

FIG. 1 is a diagram schematically illustrating the configuration of the forming system 1 in which the forming method according to the present embodiment is used. As described with reference to FIGS. 2 to 7 and the like, the forming system 1 includes a gripping device 3 for gripping a sheet material 2 and stretching and bending the sheet material 2, a sheet supplying unit 4 for supplying the gripping device 3 with a new sheet material 2, a heating device 5 for heating and softening the sheet material 2 gripped by the gripping device 3, and a forming device 6 for vacuum forming the sheet material 2 softened via heat via the heating device 5.

The gripping device 3 grips the sheet material 2 supplied by the sheet supplying unit 4, and sequentially moves to the heating device 5 and then the forming device 6 while gripping the sheet material 2. In the forming device 6, the sheet material 2 gripped by the gripping device 3 is vacuum-formed, whereby the sheet material 2 is adhered as a skin to a base material 61. The gripping device 3 returns to the sheet supplying unit 4 after the process in the forming device 6 is completed.

Suitable materials for the skin of a base material 61 as an instrument panel can be used as the sheet material 2, these including a material made of a foamed layer of a polypropylene foamed body joined to a thin film of thermoplastic olefin. The sheet material 2 has a rectangular shape in a plan view corresponding to the skin of an instrument panel.

The sheet material 2 is obtained by cutting a resin sheet basic material, which has been rolled up while being pulled in the roll-up direction, at a certain dimension in the longitudinal direction of the sheet material 2 and cutting the cut sheet material 2 centrally in the width direction of the sheet basic material. In this manner, the sheet material 2 is already stretched in the longitudinal direction when the resin sheet basic material is in the rolled-up state. In other words, the device for rolling up the resin sheet basic material while pulling the resin sheet basic material in the roll-up direction and the device for cutting the resin sheet basic material function as a unit for obtaining the sheet material 2 in a state of being stretched in the longitudinal direction.

The sheet supplying unit 4 includes a sheet transfer mechanism 41 for gripping one sheet of the sheet materials 2 stacked at the lower portion of the sheet supplying unit 4 and passing the sheet to the gripping device 3.

Figure 2:
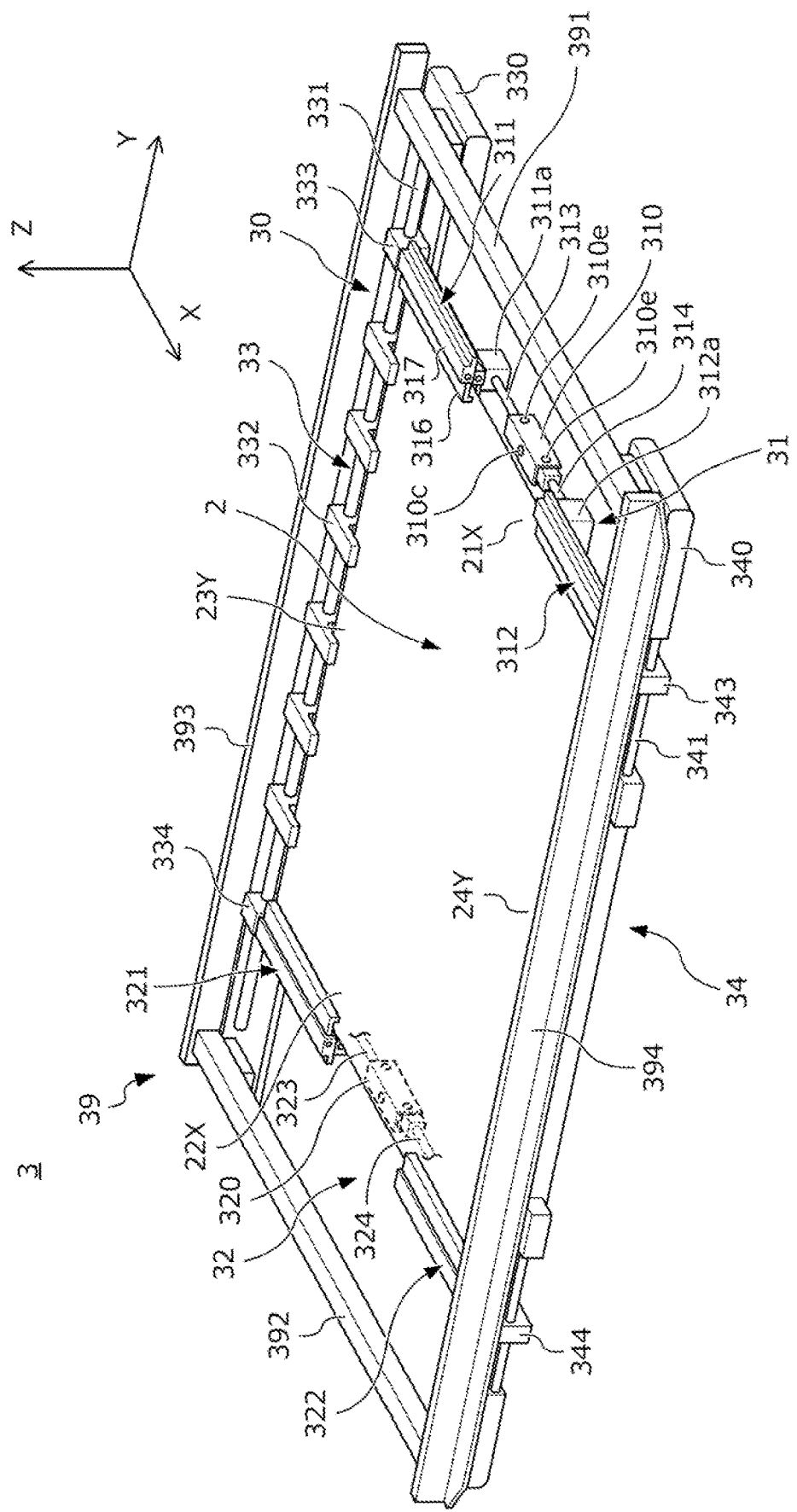
FIG. 2 is a perspective view illustrating a configuration of a gripping device.

FIG. 2 is a perspective view illustrating a configuration of the gripping device 3. As illustrated in FIG. 2, the gripping device 3 has a rectangular frame-like shape in a plan view. Hereinafter, the direction along the lateral direction of the gripping device 3 is defined as the X-axis direction, the direction orthogonal to the X-axis direction and along the longitudinal direction of the gripping device 3 is defined as the Y-axis direction, and the direction orthogonal to the X-axis direction and the Y-axis direction is defined as the Z-axis direction.

The gripping device 3 includes a fixing frame 39 with a rectangular frame-like shape in a plan view and a gripping frame 30 for gripping the sheet material 2 with a rectangular frame-like shape smaller in size than the fixing frame 39 in a plan view.

The gripping frame 30 includes a first X side member 31 and a second X side member 32 that extend along a first X side end portion 21X and a second X side end portion 22X, respectively, on both sides in the Y-direction of the sheet material 2 and a first Y side member 33 and a second Y side member 34 that extend along a first Y side end portion 23Y and a second Y side end portion 24Y, respectively, on both sides in the X-direction of the sheet material 2. The first X side member 31 grips the first X side end portion 21X of the sheet material 2, the second X side member 32 grips the second X side end portion 22X of the sheet material 2, the first Y side member 33 grips the first Y side end portion 23Y of the sheet material 2, and the second Y side member 34 grips the second Y side end portion 24Y of the sheet material 2. The four side end portions of the sheet material 2, which is rectangular in plan view, are gripped by the gripping frame 30 in this manner.

The fixing frame 39 includes a first X frame member 391 that extends along the first X side end portion 21X of the sheet material 2, a second X frame member 392 that extends along the second X side end portion 22X of the sheet material 2, a first Y frame member 393 that extends along the first Y side end portion 23Y of the sheet material 2 and joins the end portions on the negative side in the X-direction of the first X frame member 391 and the second X frame member 392, and a second Y frame member 394 that extends along the second Y side end portion 24Y of the sheet material 2 and joins the end portions on the positive side in the X-direction of the first X frame member 391 and the second X frame member 392.

The first X side member 31 includes a first bending portion 310 where the tip portion of a first bending post 67, described below, makes contact; a first X end right clamp unit 311 provided on the negative side in the X-direction of the first bending portion 310, the first X end right clamp unit 311 being for gripping the first X side end portion 21X; a first X end left clamp unit 312 provided on the positive side in the X-direction of the first bending portion 310, the first X end left clamp unit 312 being for gripping the first X side end portion 21X; a first right shaft 313 that joins the end portion on the positive side in the X-direction of the first bending portion 310 and the first X end right clamp unit 311; and a first left shaft 314 that joins the end portion on the negative side in the X-direction of the first bending portion 310 and the first X end left clamp unit 312.

Figure 3:
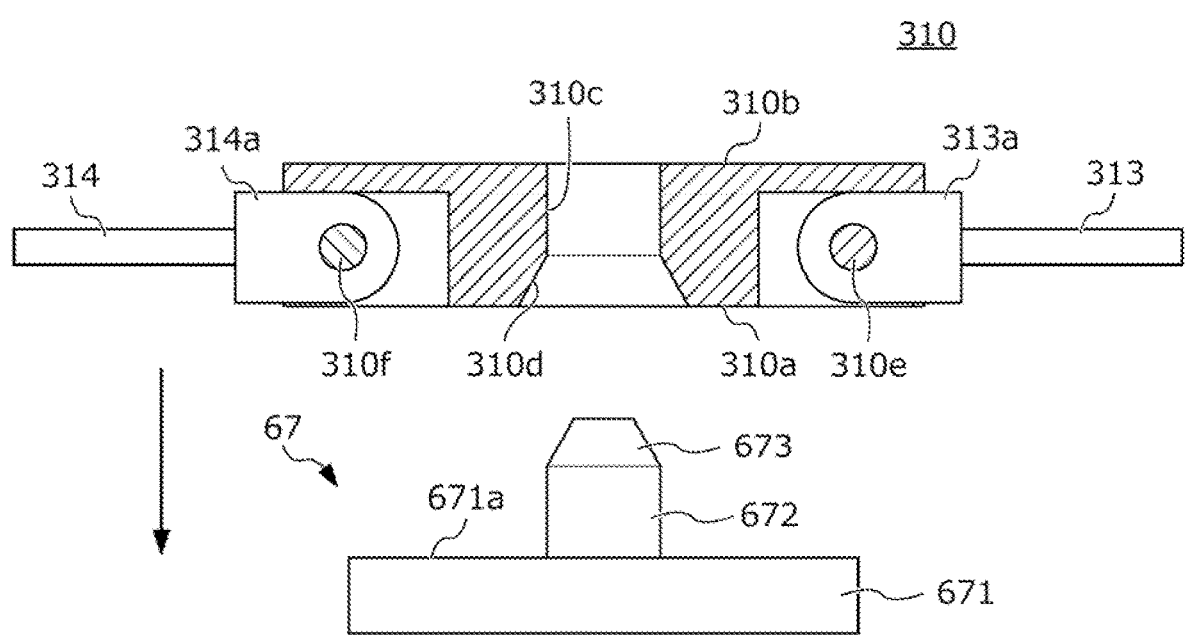
FIG. 3 is a cross-sectional view of a first bending portion of a first side member.

FIG. 3 is a cross-sectional view of the first bending portion 310. The first bending portion 310 is a column-like shape that extends in the X-direction. The lower surface along the Z-direction of the first bending portion 310 corresponds to a post contact surface 310a where the tip portion of the first bending post 67, described below, makes contact; and the upper surface along the Z-direction corresponds to a sheet contact surface 310b where the sheet material 2 makes contact. Also, in a central portion of the first bending portion 310, a guide hole 310c is formed as a through-hole that extends along the Z-direction from the post contact surface 310a to the sheet contact surface 310b. A taper surface 310d is formed on the post contact surface 310a side of the guide hole 310c.

The end portions on both side in the X-direction of the first bending portion 310 are provided with a first right rotation shaft 310e and a first left rotation shaft 310f that extend along the Y-direction. The first right rotation shaft 310e supports a tip portion 313a of the first right shaft 313 in a manner allowing for free rotation, and the first left rotation shaft 310f supports a tip portion 314a of the first left shaft 314 in a manner allowing for free rotation. In this manner, the first X side member 31, at both end portions of the first bending portion 310, can freely bend about the first right rotation shaft 310e and the first left rotation shaft 310f.

Returning to FIG. 2, the first X end right clamp unit 311 has a rectangular shape that extends along the X-direction in a plan view. The end portion on the positive side in the X-direction of the first X end right clamp unit 311 is provided with a first right shaft support portion 311a that supports the base end portion of the first right shaft 313 in a manner allowing it to freely slide along the X-direction. In this manner, the distance in the X-direction between the first X end right clamp unit 311 and the first bending portion 310 can be adjusted by the first X end right clamp unit 311 sliding along the first right shaft 313.

Also, the end portion on the negative side in the X-direction of the first X end right clamp unit 311 is joined to the first Y side member 33 and a first support shaft 331 via a first X end clamp support portion 333 described below. In this manner, the end portion on the negative side in the X-direction of the first X end right clamp unit 311 can freely rotate about the first support shaft 331.

Figure 4A:
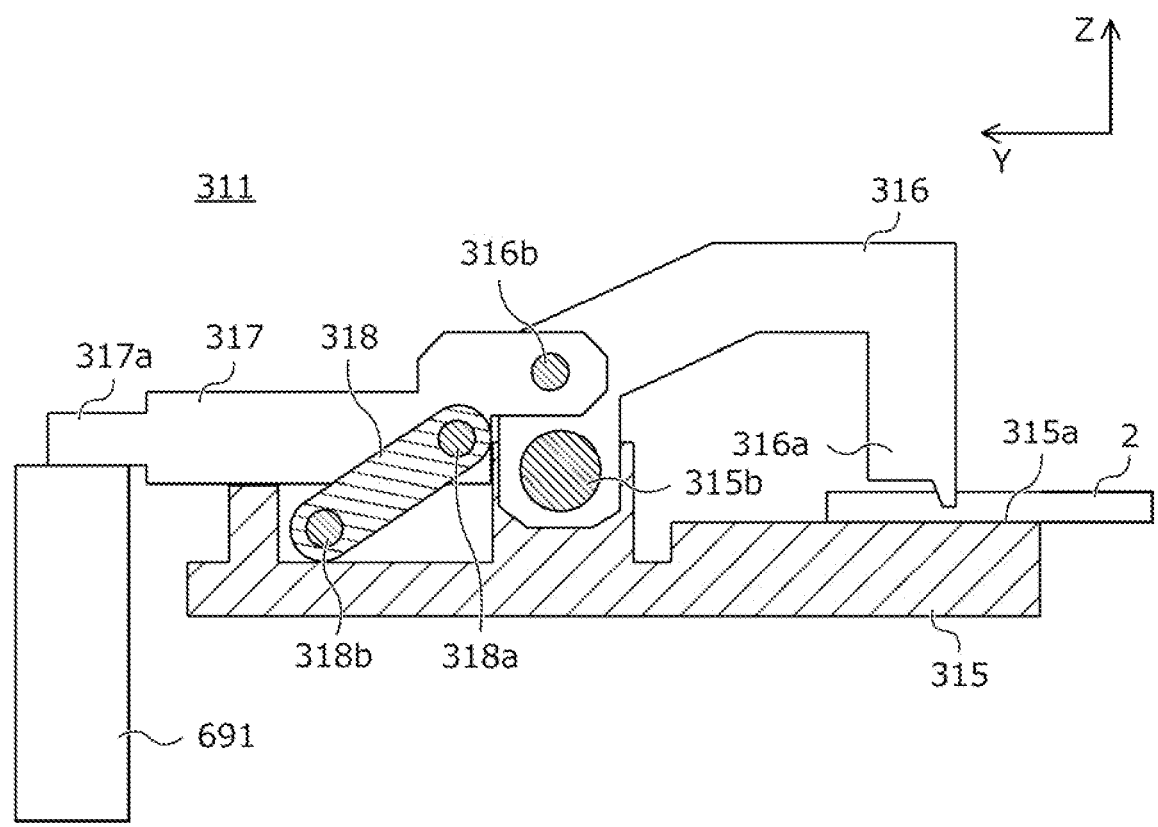
FIG. 4A is a partial cross-sectional view of a first X end right clamp unit of the first side member.
Figure 4B:
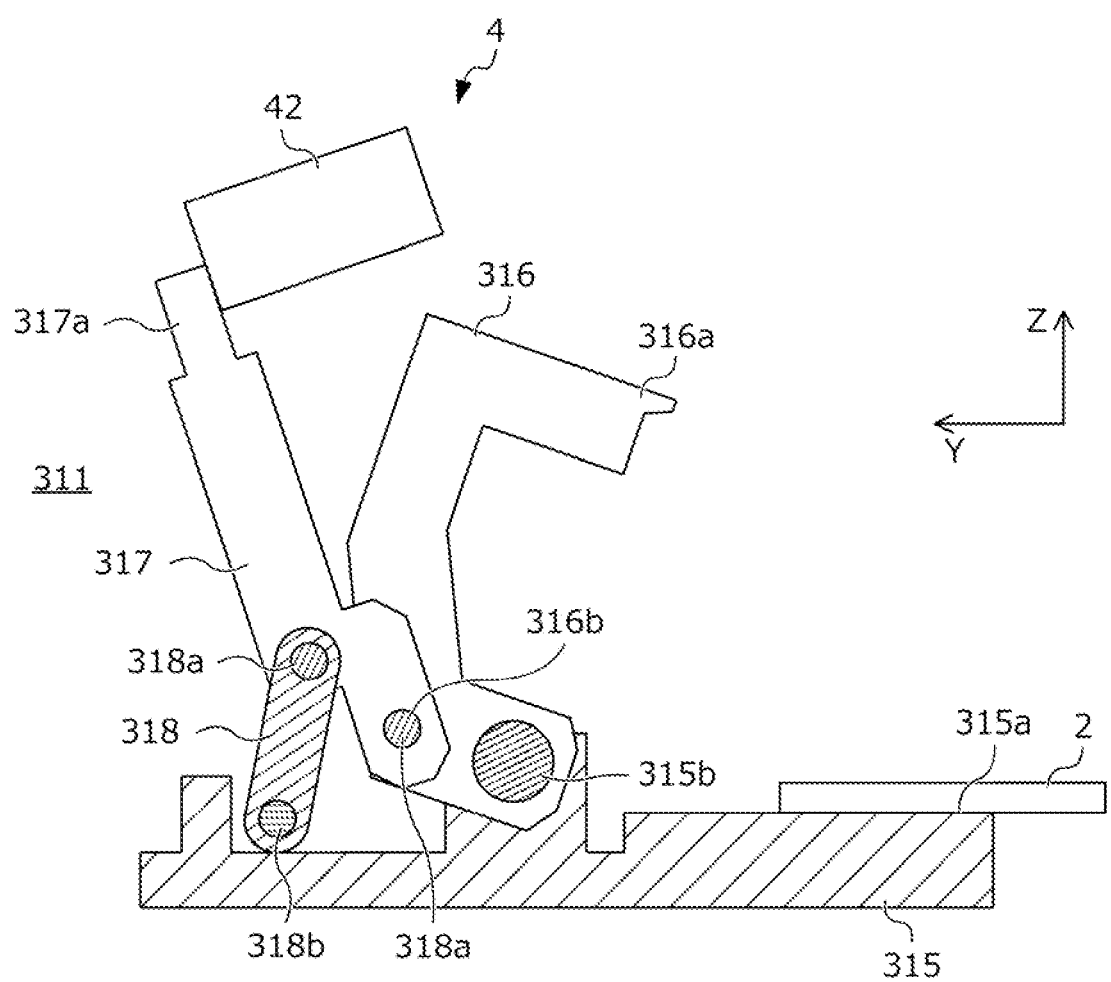
FIG. 4B is a partial cross-sectional view of the first X end right clamp unit of the first side member.

FIGS. 4A and 4B are partial cross-sectional views taken along the Y-direction of the first X end right clamp unit 311. The first X end right clamp unit 311 includes a clamp base portion 315, a clamp arm 316, a clamp lever 317, and a link 318.

The clamp base portion 315 extends along the Y-direction on the lower surface side of the sheet material 2. A contact surface 315a where the lower surface of the sheet material 2 makes contact is formed on the tip portion of the clamp base portion 315. The clamp arm 316 extends along the Y-direction on the upper surface side of the sheet material 2. A catch portion 316a where the upper surface of the sheet material 2 makes contact is provided on the tip portion of the clamp arm 316. Also, the base end portion of the clamp arm 316 is joined to the clamp base portion 315 via an open/close shaft 315b extending along the X-direction. Furthermore, an arm shaft 316b that extends along the X-direction is provided on the clamp arm 316 between the catch portion 316a and the open/close shaft 315b.

The clamp lever 317 extends along the Y-direction. The tip portion of the clamp lever 317 is joined to the clamp arm 316 via the arm shaft 316b described above. A first link shaft 318a and a second link shaft 318b that extend along the X-direction are provided at the two end portions of the link 318. The first link shaft 318a joins the base end portion of the link 318 and the clamp base portion 315 at a portion on the base end side of the open/close shaft 315b. The second link shaft 318b joins the tip portion of the link 318 and the clamp lever 317 at a portion between the arm shaft 316b and a base end portion 317a.

According to the first X end right clamp unit 311 with the configuration described above, when the base end portion 317a of the clamp lever 317 is pushed downward in the Z-direction by a clamp cylinder 42 provided on the sheet supplying unit 4, the edge portion of the sheet material 2 is pinched between the catch portion 316a of the clamp arm 316 and the contact surface 315a of the clamp base portion 315 (see FIG. 4B). In other words, when the base end portion 317a of the clamp lever 317 is pushed downward, the clamp lever 317 moves toward the catch portion 316a side, rotating counterclockwise about the second link shaft 318b. When the clamp lever 317 moves toward the catch portion 316a side, the clamp arm 316 rotates clockwise about the open/close shaft 315b, bringing the catch portion 316a toward the contact surface 315a. In this manner, the end portion of the sheet material 2 is gripped by the first X end right clamp unit 311.

Also, according to the first X end right clamp unit 311 with the configuration described below, when the base end portion 317a of the clamp lever 317 is pushed upward in the Z-direction by a first right unclamp unit 691 described below, the catch portion 316a of the clamp arm 316 separates from the contact surface 315a of the clamp base portion 315, releasing the grip on the sheet material 2 (see FIG. 4A). In other words, when the base end portion 317a of the clamp lever 317 is pushed upward, the clamp lever 317 moves toward the base end portion 317a side, rotating clockwise about the second link shaft 318b. When the clamp lever 317 moves toward the base end portion 317a side, the clamp arm 316 rotates counterclockwise about the open/close shaft 315b, separating the catch portion 316a from the contact surface 315a. In this manner, the grip of the first X end right clamp unit 311 on the sheet material 2 is released.

Returning to FIG. 2, the first X end clamp unit 312 has a rectangular shape that extends along the X-direction in a plan view. The end portion on the negative side in the X-direction of the first X end clamp unit 312 is provided with a first left shaft support portion 312a that supports the base end portion of the first left shaft 314 in a manner allowing it to freely slide along the X-direction. In this manner, the distance in the X-direction between the first X end left clamp unit 312 and the first bending portion 310 can be adjusted by the first X end left clamp unit 312 sliding along the first left shaft 314.

Also, the end portion on the positive side in the X-direction of the first X end left clamp unit 312 is joined to the second Y side member 34 and a second support shaft 341 via a first X end clamp support portion 343 described below. In this manner, the end portion on the positive side in the X-direction of the first X end left clamp unit 312 can freely rotate about the second support shaft 341. Note that the first X end left clamp unit 312 has the same configuration as the first X end right clamp unit 311 described with reference to FIGS. 4A and 4B in terms of including a clamp base portion, a clamp arm, a clamp lever, and a link. As such, a detailed description of the configuration of the first X end left clamp unit 312 will be omitted.

The second X side member 32 includes a second bending portion 320 where the tip portion of a second bending post 68, described below, makes contact; a second X end left clamp unit 321 provided on the positive side in the X-direction of the second bending portion 320, the second X end left clamp unit 321 being for gripping the second X side end portion 22X; a second X end right clamp unit 322 provided on the negative side in the X-direction of the second bending portion 320, the second X end right clamp unit 322 being for gripping the second X side end portion 22X; a second left shaft 323 that joins the end portion on the positive side in the X-direction of the second bending portion 320 and the second X end left clamp unit 321; and a second right shaft 324 that joins the end portion on the negative side in the X-direction of the second bending portion 320 and the second X end right clamp unit 322.

The configurations of the second bending portion 320, the second X end left clamp unit 321, the second X end right clamp unit 322, the second left shaft 323, and the second right shaft 324 are the same as the configurations of the first bending portion 310, the first X end right clamp unit 311, the first X end left clamp unit 312, the first right shaft 313, and the first left shaft 314 of the first X side member 31. As such, a detailed description thereof is omitted.

The first Y side member 33 includes a first base portion 330 that extends along the Y-direction, the first support shaft 331 that extends along the Y-direction and is supported by the first base portion 330, a plurality (six in the example illustrated in FIG. 2) of Y end clamps 332 provided on the first support shaft 331, the first X end clamp support portion 333 provided on the end portion on the positive side in the Y-direction of the first support shaft 331, and a second X end clamp support portion 334 provided on the end portion on the negative side in the Y-direction of the first support shaft 331.

The Y end clamps 332 each include a clamp pair that can open and close using the first support shaft 331 as a rotation shaft, with the first Y side end portion 23Y of the sheet material 2 being gripped by the clamp pair.

The first base portion 330 extends parallel with the first Y frame member 393 on the Z-direction lower side of the fixing frame 39. The end portion on the positive side in the Y-direction of the first base portion 330 is joined to an X-axis guide rail (not illustrated) provided on the lower surface side of the first X frame member 391, and the end portion on the negative side in the Y-direction of the first base portion 330 is joined to an X-axis guide rail (not illustrated) provided on the lower surface side of the second X frame member 392. In this manner, the first base portion 330 can freely slide in the X-direction along the fixing frame 39 via the X-axis guide rails provided on the X frame members 391, 392.

The first X end clamp support portion 333 supports the end portion on the negative side in the X-direction of the first X end right clamp unit 311 of the first X side member 31 in a manner allowing for free rotation about the first support shaft 331. Also, the first X end clamp support portion 333 is joined to a Y-axis guide rail (not illustrated) provided on the first base portion 330. In this manner, the first X side member 31 can freely slide in the Y-direction along the fixing frame 39 via the Y-axis guide rail provided on the first base portion 330.

The second X end clamp support portion 334 supports the end portion on the negative side in the X-direction of the second X end left clamp unit 321 of the second X side member 32 in a manner allowing for free rotation about the first support shaft 331. Also, the second X end clamp support portion 334 is joined to a Y-axis guide rail (not illustrated) provided on the first base portion 330. In this manner, the second X side member 32 can freely slide in the Y-direction along the fixing frame 39 via the Y-axis guide rail provided on the first base portion 330.

The second Y side member 34 includes a second base portion 340 that extends along the Y-direction, the second support shaft 341 that extends along the Y-direction and is supported by the second base portion 340, a plurality of Y end clamps (not illustrated) provided on the second support shaft 341, the first X end clamp support portion 343 provided on the end portion on the positive side in the Y-direction of the second support shaft 341, and a second X end clamp support portion 344 provided on the end portion on the negative side in the Y-direction of the second support shaft 341.

In a similar manner to the plurality of Y end clamps 332 provided on the first Y side member 33, the plurality of Y end clamps provided on the second support shaft 341 each include a clamp pair that can open and close using the second support shaft 341 as a rotation shaft, with the second Y side end portion 24Y of the sheet material 2 being gripped by the clamp pair.

The second base portion 340 extends parallel with the second Y frame member 394 on the Z-direction lower side of the fixing frame 39. The end portion on the positive side in the Y-direction of the second base portion 340 is joined to an X-axis guide rail (not illustrated) provided on the lower surface side of the first X frame member 391, and the end portion on the negative side in the Y-direction of the second base portion 340 is joined to an X-axis guide rail (not illustrated) provided on the lower surface side of the second X frame member 392. In this manner, the second base portion 340 can freely slide in the X-direction along the fixing frame 39 via the X-axis guide rails provided on the X frame members 391, 392.

The first X end clamp support portion 343 supports the end portion on the positive side in the X-direction of the first X end left clamp unit 312 of the first X side member 31 in a manner allowing for free rotation about the second support shaft 341. Also, the first X end clamp support portion 343 is joined to a Y-axis guide rail (not illustrated) provided on the second base portion 340. In this manner, the first X side member 31 can freely slide in the Y-direction along the fixing frame 39 via the Y-axis guide rail provided on the second base portion 340.

The second X end clamp support portion 344 supports the end portion on the positive side in the X-direction of the second X end right clamp unit 322 of the second X side member 32 in a manner allowing for free rotation about the second support shaft 341. Also, the second X end clamp support portion 344 is joined to a Y-axis guide rail (not illustrated) provided on the second base portion 340. In this manner, the second X side member 32 can freely slide in the Y-direction along the fixing frame 39 via the Y-axis guide rail provided on the second base portion 340.

Figure 5A:
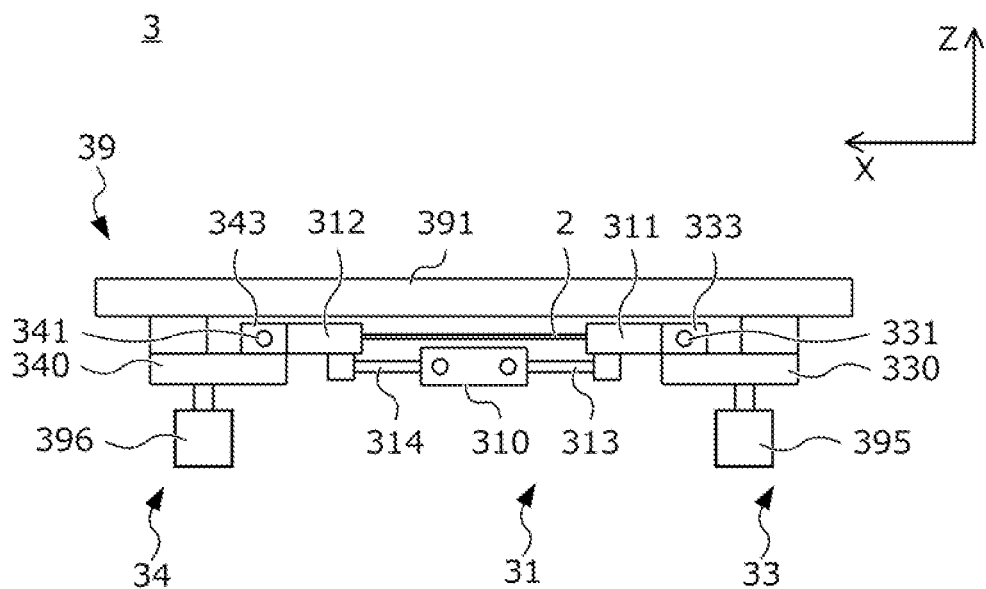
FIG. 5A is a diagram schematically illustrating the gripping device in a side view along the Y-direction as seen from a first X side member side.
Figure 5B:
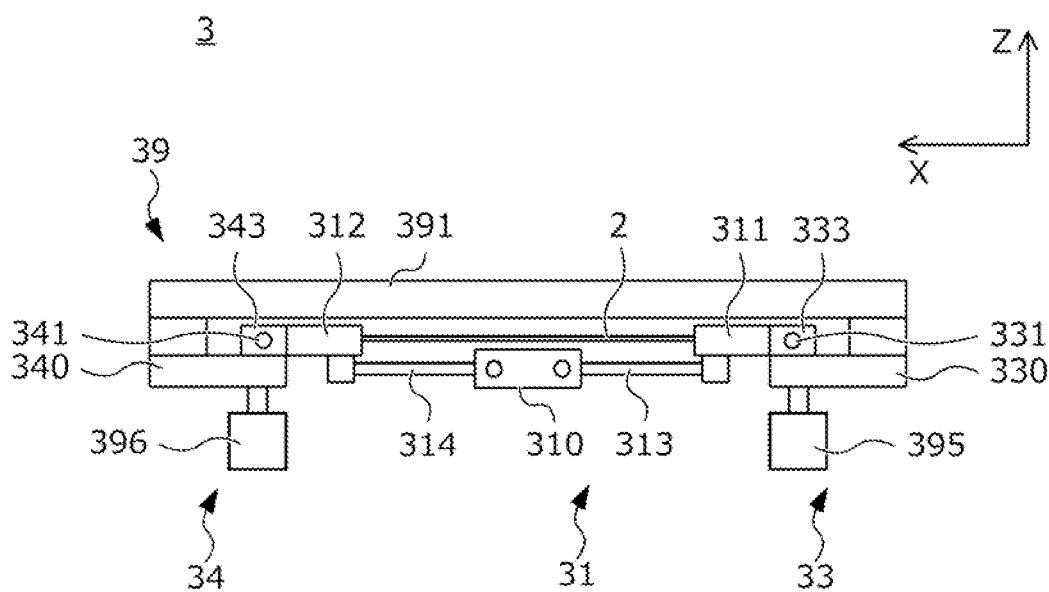
FIG. 5B is a diagram schematically illustrating the gripping device in a side view along the Y-direction as seen from the first X side member side.

FIGS. 5A and 5B are diagrams schematically illustrating the gripping device 3 in a side view along the Y-direction as seen from the first X side member 31 side. As described above, the end portion on the negative side in the X-direction of the first X end right clamp unit 311 of the first X side member 31 is joined to the first base portion 330 via the first X end clamp support portion 333 of the first Y side member 33. Also, the end portion on the positive side in the X-direction of the first X end left clamp unit 312 of the first X side member 31 is joined to the second base portion 340 via the first X end clamp support portion 343 of the second Y side member 34. Furthermore, the first base portion 330 and the second base portion 340 are joined by the X-axis guide rails provided on the first X frame member 391 of the fixing frame 39 and can freely slide in the X-direction along the fixing frame 39.

The fixing frame 39 includes a first X-axis actuator 395 for sliding the first base portion 330 along the X-axis guide rail and a second X-axis actuator 396 for sliding the second base portion 340 along the X-axis guide rail. Accordingly, in the gripping device 3, by driving the X-axis actuators 395, 396 and sliding the first base portion 330 toward the negative side in the X-direction and the second base portion 340 toward the positive side in the X-direction, as illustrated in FIG. 5B, the sheet material 2 gripped by the first X end right clamp unit 311 and the first X end left clamp unit 312 can be stretched in the X-direction. The configuration of the gripping device 3 on the second X side member 32 side is similar to that illustrated in FIGS. 5A and 5B, and thus illustration and a detailed description thereof is omitted.

Figure 6A:
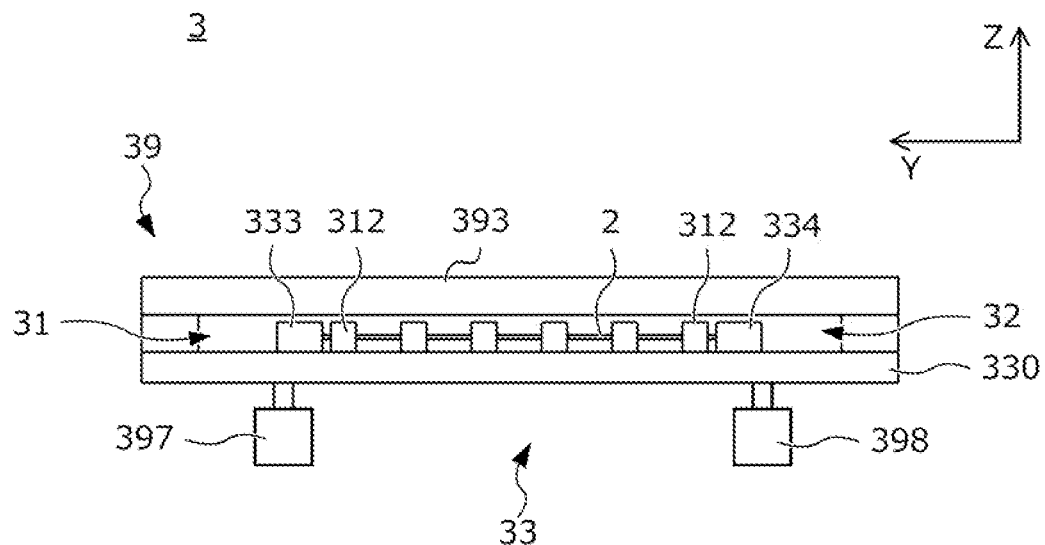
FIG. 6A is a diagram schematically illustrating the gripping device in a side view along the X-direction as seen from a first Y side member side.
Figure 6B:
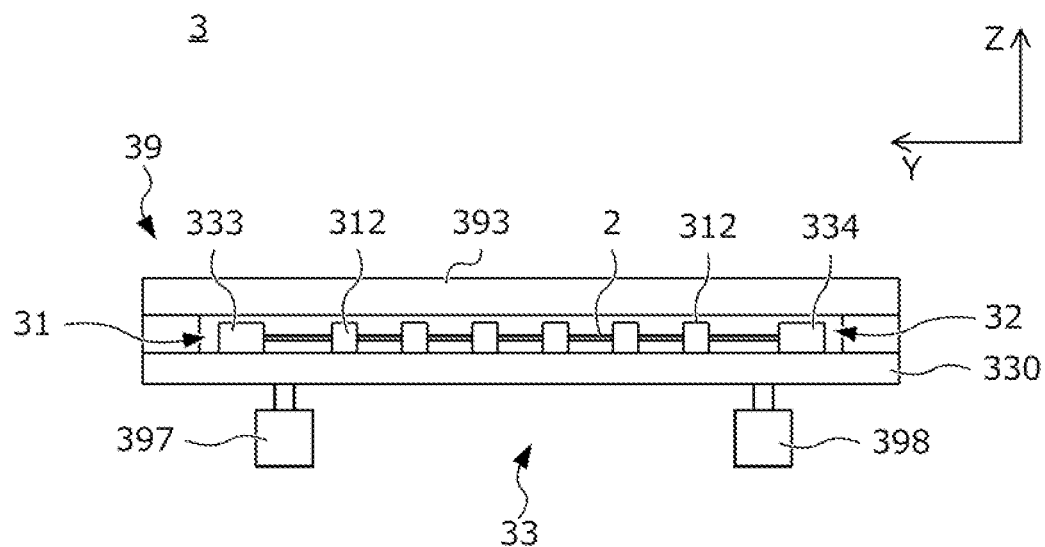
FIG. 6B is a diagram schematically illustrating the gripping device in a side view along the X-direction as seen from a first Y side member side.

FIGS. 6A and 6B are diagrams schematically illustrating the gripping device 3 in a side view along the X-direction as seen from the first Y side member 33 side. Note that in FIGS. 6A and 6B, to facilitate understanding, the first support shaft 331 is omitted. As described above, the first X end clamp support portion 333 of the first Y side member 33 is joined to the Y-axis guide rail provided on the first base portion 330. In this manner, the first X end clamp support portion 333 can freely slide in the Y-direction along the fixing frame 39 via the Y-axis guide rail provided on the first base portion 330. Also, the second X end clamp support portion 334 of the first Y side member 33 is joined to a Y-axis guide rail provided on the first base portion 330. In this manner, the second X end clamp support portion 334 can freely slide in the Y-axis along the fixing frame 39 via the Y-axis guide rail provided on the first base portion 330.

The fixing frame 39 includes a first Y-axis actuator 397 for sliding the first X end clamp support portion 333 along the Y-axis guide rail and a second Y-axis actuator 398 for sliding the second X end clamp support portion 334 along the Y-axis guide rail. Accordingly, in the gripping device 3, by driving the Y-axis actuators 397, 398 and sliding the first X end clamp support portion 333 toward the positive side in the y-direction and the second X end clamp support portion 334 toward the negative side in the Y-direction, as illustrated in FIG. 6B, the sheet material 2 gripped by the first X side member 31 and the second X side member 32 can be stretched in the Y-direction. The configuration of the gripping device 3 on the second Y side member 34 side is similar to that illustrated in FIGS. 6A and 6B, and thus illustration and a detailed description thereof is omitted.

Figure 7:
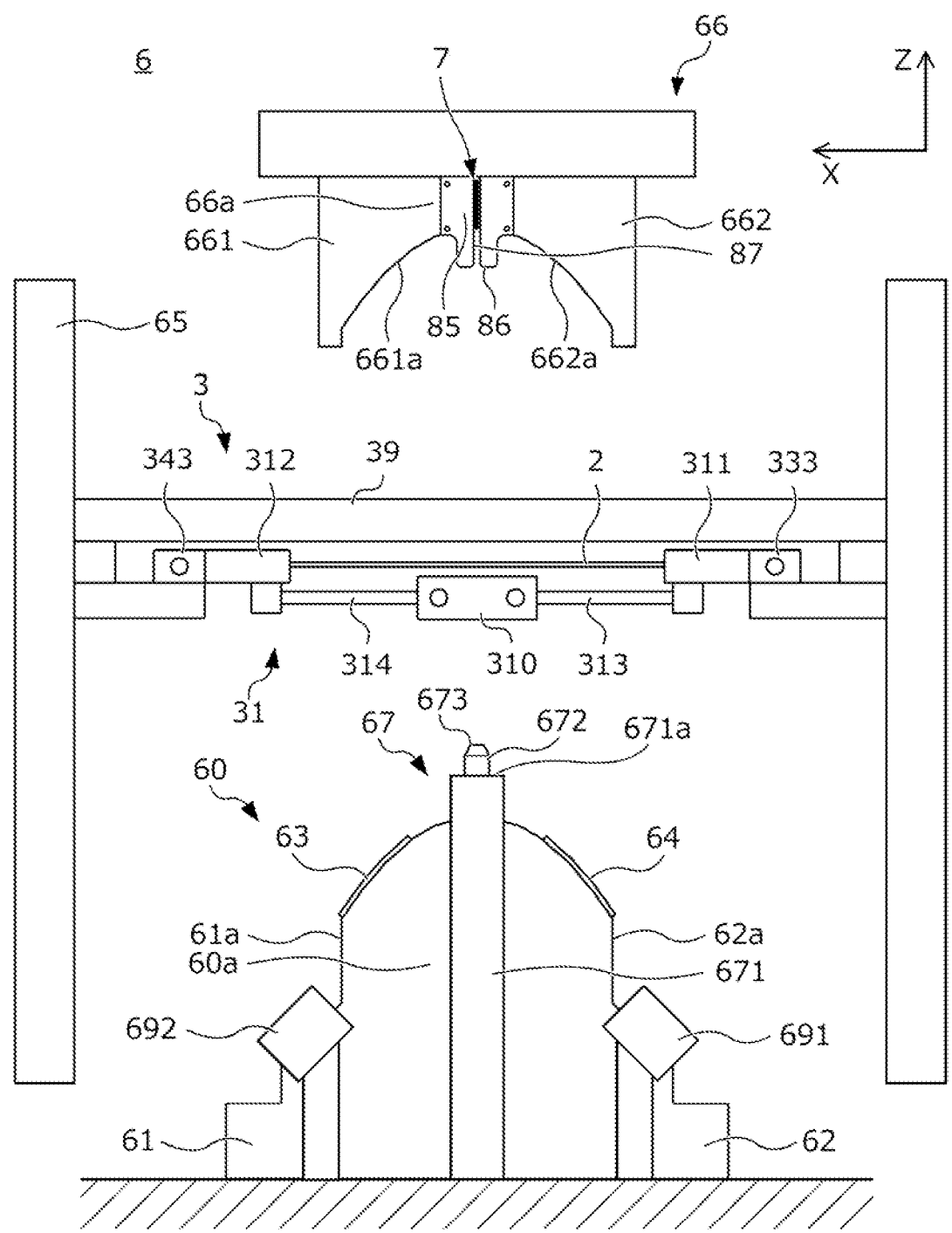
FIG. 7 is a diagram schematically illustrating a forming device in a side view along the Y-direction as seen from the first X side member side of the gripping device.
Figure 8:
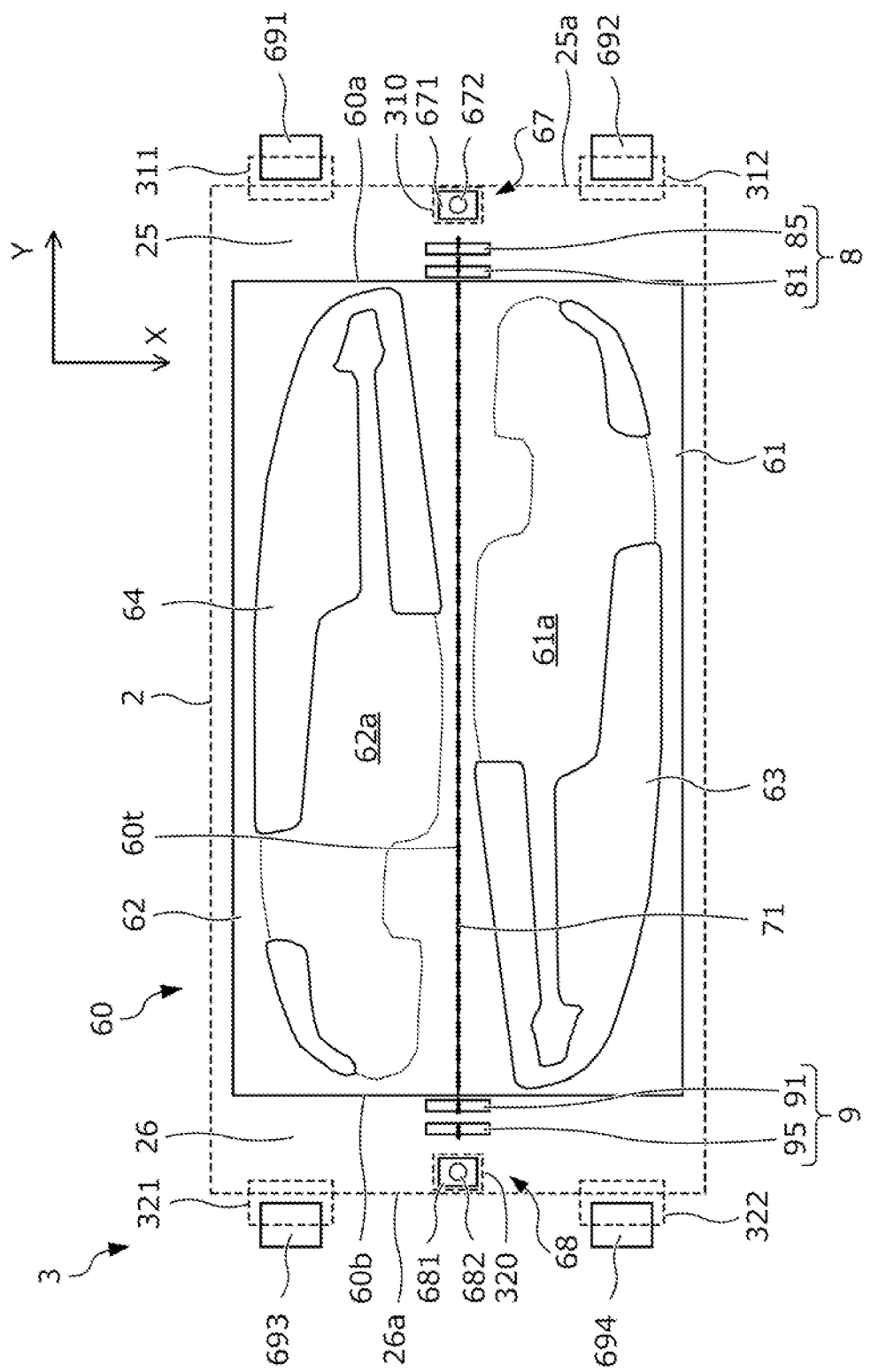
FIG. 8 is a diagram schematically illustrating the forming device in a plan view along the Z-direction as seen from above.

Next, the configuration of the forming device 6 will be described with reference to FIGS. 7 to 11B. FIG. 7 is a diagram schematically illustrating the forming device 6 in a side view along the Y-direction as seen from the first X side member 31 side of the gripping device 3. FIG. 8 is a diagram schematically illustrating the forming device 6 in a plan view along the Z-direction as seen from above. Note that in FIG. 8, the sheet material 2 gripped by the gripping frame of the gripping device 3, the bending portions 310, 320, which are components of the gripping frame, and the first X end right clamp units 311, 321 and the first X end left clamp units 312, 322 for gripping the sheet material 2 are illustrated with a dashed line.

The forming device 6 includes a lower die 60, an upper die 66 provided on the positive side in the Z-direction of the lower die 60 (above the lower die 60 in the vertical direction) on the other side of the sheet material 2, a lowering device 65 for lowering the gripping device 3 along the Z-direction between the lower die 60 and the upper die 66 and bringing the sheet material 2 gripped by the gripping device 3 toward the lower die 60, the first bending post 67 and the second bending post 68 provided on both sides in the Y-direction of the lower die surfaces 61a, 62a of the lower die 60, the first right unclamp unit 691 and the first left unclamp unit 692 provided on the positive side in the Y-direction of the lower die surfaces 61a, 62a, and a second left unclamp unit 693 and a second right unclamp unit 694 provided on the negative side in the Y-direction of the lower die surfaces 61a, 62a.

As illustrated in FIG. 8, the lower die 60 is shaped as a rectangle having the Y-direction as the longitudinal direction and the X-direction as the width direction in plan view, and is divided into two of a first lower die 61 and a second lower die 62 in a center in the width direction. In the first lower die 61 and the second lower die 62, the first lower die surface 61a and the second lower die surface 62a are formed, respectively, having the same shape. Also, on the first lower die surface 61a and the second lower die surface 62a, a first base material 63 and a second base material 64 are placed, respectively, having the same shape.

As illustrated in FIG. 8, the first lower die surface 61a and the second lower die surface 62a have the same shape and are provided back-to-back in a plan view. Thus, the lower die 60 including the first lower die 61 and the second lower die 62 has an overall shape that protrudes upward along the Y-direction in a side view. A suction device (not illustrated) is connected to the first lower die surface 61a and the second lower die surface 62a, enabling a gas to be suctioned from the lower die surfaces 61a, 62a.

Also, the first base material 63 placed on the first lower die surface 61a and the second base material 64 placed on the second lower die surface 62a have the same shape and are provided back-to-back in a plan view. Thus, in the forming device 6, the sheet material 2 can be adhered to the two base materials 63, 64 at the same time. According to the forming device 6, the lower die 60 and the upper die 66 provided on either side of the sheet material 2 are clamped together, and a first product portion formed by the first lower die surface 61a and a second product portion formed by the second lower die surface 62a can be manufactured at the same time.

The upper die 66 has an upward recessed shape in a side view along the Y-direction. The upper die 66 is shaped as a rectangle having the Y-direction as the longitudinal direction and the X-direction as the width direction in plan view, and is divided into two of a first upper die 661 and a second upper die 662 in a center in the width direction. The first upper die 661 includes a first upper die surface 661a and a second upper die surface 662a that face the first lower die surface 61a and the second lower die surface 62a, respectively, when the lower die and the upper die are clamped together. The upper die 66 is movable toward and away from the lower die 60 along the Z-direction by a raising and lowering mechanism (not illustrated). Also, a suction device (not illustrated) is connected to the upper die surfaces 661a, 662a, enabling a gas to be suctioned from the upper die surfaces 661a, 662a.

Hereinafter, as illustrated in FIG. 8, in the sheet material 2 gripped by the gripping device 3, a portion outside a first lower die end 60a on the positive side in the Y-direction in a side view along the X-direction of the lower die 60 is referred to as a first excess edge portion 25, and a portion outside a second lower die end 60b on the negative side in the Y-direction is referred to as a second excess edge portion 26.

The gripping frame 30 of the gripping device 3 grips at least a portion of edge sides of the sheet material 2 on both positive and negative sides in the Y-direction by the clamp units 311, 312, 321, 322 between the lower die 60 and the upper die 66 such that a first positioning portion 8 and a second positioning portion 9, described below, are disposed inside the edge sides of the sheet material 2 in plan view.

The lowering device 65 is provided between the lower die 60 and the upper die 66. The lowering device 65 lowers the gripping device 3 along the Z-direction via a driving force generated by a hydraulic cylinder, an electromagnetic actuator, or the like and brings the sheet material 2 gripped by the gripping frame 30 toward the lower die 60. Note that at this time, the lowering device 65 preferably only grips the fixing frame 39 of the gripping device 3. This allows the gripping frame 30 to be deformed while the gripping device 3 is being lowered.

The first bending post 67 includes a first column member 671 erected near the lower die 60 that extends along the Z-direction and a first bending post pin 672 provided on the tip portion of the first column member 671. As illustrated in FIG. 3, the outer diameter of the first bending post pin 672 is slightly less than the inner diameter of the guide hole 310c of the first bending portion 310. Also, the tip portion of the first bending post pin 672 is formed as a tapered surface 673 that decreases in diameter from the base end toward the tip. In this manner, by bringing the first bending portion 310 toward the tip portion of the first bending post 67, the first bending post pin 672 is inserted into the guide hole 310c of the first bending portion 310, and, while aligning the first bending portion 310 with the first bending post 67, the post contact surface 310a of the first bending portion 310 can be brought into contact with a tip surface 671a of the first column member 671. Also, as illustrated in FIG. 7, the height in the Z-direction of the tip surface 671a of the first bending post 67 is greater than the highest portion where the height in the Z-direction of the lower die 60 is highest. Here, the highest portion where the height in the Z-direction of the lower die 60 is highest is a portion in a center in the width direction parallel to the X-direction of the lower die 60 in a side view seen in the Y-direction, and is a lower die ridge line 60t (see FIG. 8) extending along the Y-direction between the first lower die 61 and the second lower die 62. In other words, the tip surface 671a of the first bending post 67 is provided above the lower die ridge line 60t in the vertical direction. Note that though drawings and a detailed description are omitted, the second bending post 68 includes a second column member 681 and a second bending post pin 682 with the same configuration as the first column member 671 and the first bending post pin 672 described above.

As illustrated in FIG. 8, the first bending post 67 is provided outside the first lower die end 60a of the lower die 60, and the second bending post 68 is provided outside the second lower die end 60b of the lower die 60. The first bending post 67 and the second bending post 68 are provided at positions opposing one another in the X-direction on either side of the lower die 60 in a plan view. Also, the first bending post 67 and the second bending post 68 are provided in a center in the width direction of the lower die 60 in a side view along the Y-direction, i.e., on an extension line of the lower die ridge line 60t. Also, the first bending post 67 is provided on the lower side in the Z-direction of the first bending portion 310, which is a portion of the gripping frame for gripping the sheet material 2, and the second bending post 68 is provided on the lower side in the Z-direction of the second bending portion 320, which is a portion of the gripping frame. In this manner, by lowering the gripping device 3 in the Z-direction via the lowering device 65, the bending portions 310, 320 can be brought into contact with the bending posts 67, 68 before the sheet material 2 comes into contact with the lower die surfaces 61a, 62a. Then, after the bending portions 310, 320 have come into contact with the bending posts 67, 68, by further lowering the fixing frame 39 of the gripping device 3 via the lowering device 65, the gripping frame 30 can be bent to protrude upward in a side view along the Y-direction by the bending posts 67, 68.

Figure 9:
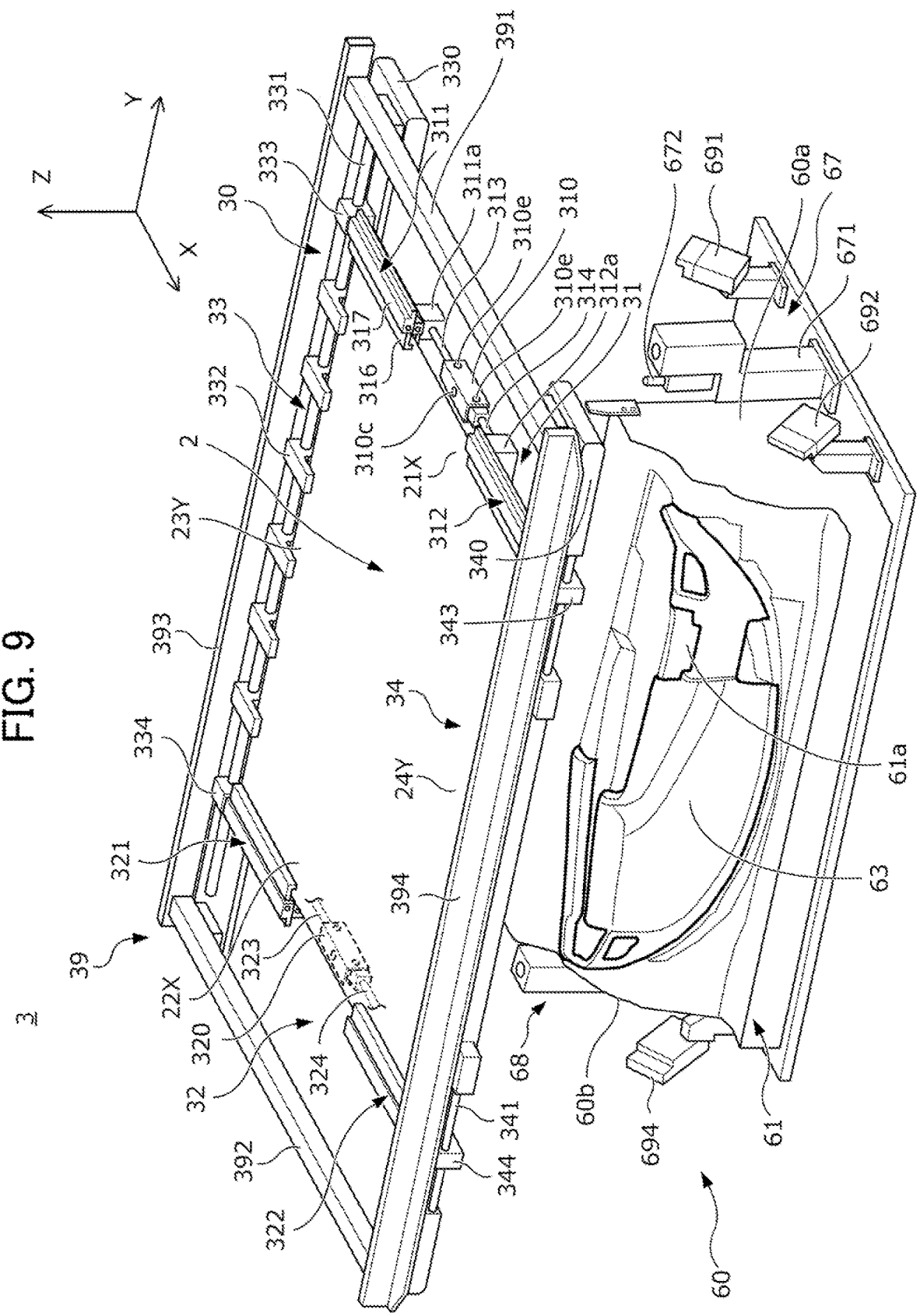
FIG. 9 is a perspective view of a lower die and the gripping device.

FIG. 9 is a perspective view of the lower die 60 and the gripping device 3. Note that in FIG. 9, to facilitate understanding, the second lower die 62 of the lower die 60 is omitted. As illustrated in FIGS. 8 and 9, the first right unclamp unit 691 and the first left unclamp unit 692 are provided outside the first lower die end 60a of the lower die 60, and the second left unclamp unit 693 and the second right unclamp unit 694 are provided outside the second lower die end 60b of the lower die 60. The first right unclamp unit 691 is provided further to the negative side in the X-direction than the first bending post 67, and the first left unclamp unit 692 is provided further to the positive side in the X-direction than the first bending post 67. The second left unclamp unit 693 is provided further to the negative side in the X-direction than the second bending post 68, and the second right unclamp unit 694 is provided further to the positive side in the X-direction than the second bending post 68.

As illustrated in FIG. 8, in a plan view, the first right unclamp unit 691 is provided on the lower side in the Z-direction of the first X end right clamp unit 311 of the gripping frame and comes to face the first X end right clamp unit 311 when the gripping device 3 is lowered as described below. In a plan view, the first left unclamp unit 692 is provided on the lower side in the Z-direction of the first X end left clamp unit 312 of the gripping frame and comes to face the first X end left clamp unit 312 when the gripping device 3 is lowered. In a plan view, the second left unclamp unit 693 is provided on the lower side in the Z-direction of the second X end left clamp unit 321 of the gripping frame and comes to face the second X end left clamp unit 321 when the gripping device 3 is lowered as described below. In a plan view, the second right unclamp unit 694 is provided on the lower side in the Z-direction of the second X end right clamp unit 322 of the gripping frame and comes to face the second X end right clamp unit 322 when the gripping device 3 is lowered as described below. By the base end portions of the clamp levers of the clamp units 311, 312, 321, 322 disposed opposing the unclamp units 691, 692, 693, 694 being pushed upward in the Z-direction when the gripping device 3 is lowered, the grip of the clamp units 311, 312, 321, 322 on the sheet material 2 is released (see FIG. 4A described above).

Figure 10:
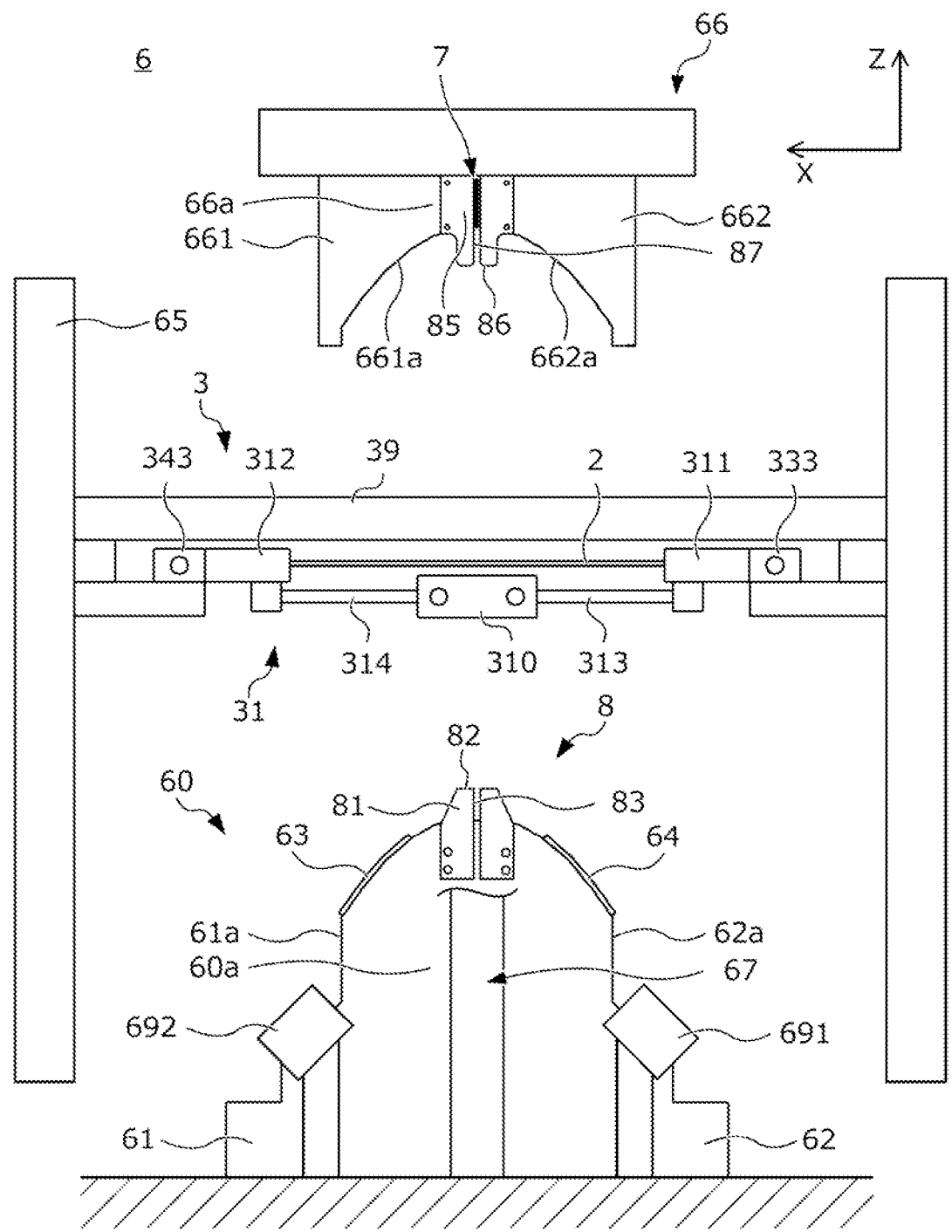
FIG. 10 is a partially broken view of the forming device in the side view of FIG. 7.

FIG. 10 is a diagram schematically illustrating the forming device 6 in a side view seen along the same direction as in FIG. 7. Note that to facilitate understanding, FIG. 10 illustrates a diagram in which a portion of the first bending post 67 of the forming device 6 is cut-away.

As illustrated in FIGS. 8 and 10, the forming device 6 includes a trim blade 7 that cuts the sheet material 2 provided between the lower die 60 and the upper die 66, and the first positioning portion 8 and the second positioning portion 9 that position a portion of the first excess edge portion 25 and a portion of the second excess edge portion 26 of the sheet material 2, respectively, when the sheet material 2 is cut with the trim blade 7.

The trim blade 7 has a plate shape provided with a cutting edge extending in the Y-direction, and is provided in the upper die 66. Specifically, the trim blade 7 is provided between the first upper die 661 and the second upper die 662, and is configured to be freely moved by a drive device (not illustrated) along the Z-direction of the upper dies 661, 662. In FIG. 8, a cut plane 71 of the trim blade 7 (i.e., a surface formed by the cutting edge of the trim blade 7 when the trim blade 7 is moved within a movable range along the Z-direction) is illustrated with a thick dashed line. As illustrated in FIG. 8, the cut plane 71 of the trim blade 7 extends over the lower die ridge line 60t along the Y-direction from between the first lower die end 60a and the first bending post 67 to between the second lower die end 60b and the second bending post 68 in plan view. Thus, the cut plane 71 of the trim blade 7 intersects the first excess edge portion 25 on the positive side in the Y-direction and the second excess edge portion 26 on the negative side in the Y-direction of the sheet material 2.

As illustrated in FIGS. 8 and 10, the first positioning portion 8 includes a first lower plate 81 and a first upper plate 85 provided on either side of the first excess edge portion 25 of the sheet material 2, on the outer side of the first lower die end 60a of the lower die 60 (i.e., on the first bending post 67 side of the first lower die end 60a). The first positioning portion 8 positions the first excess edge portion 25 by sandwiching a portion of the first excess edge portion 25 intersecting the cut plane 71 of the trim blade 7 between the lower plate 81 and the upper plate 85 when the lower die 60 and the upper die 66 are clamped together.

Figure 11A:
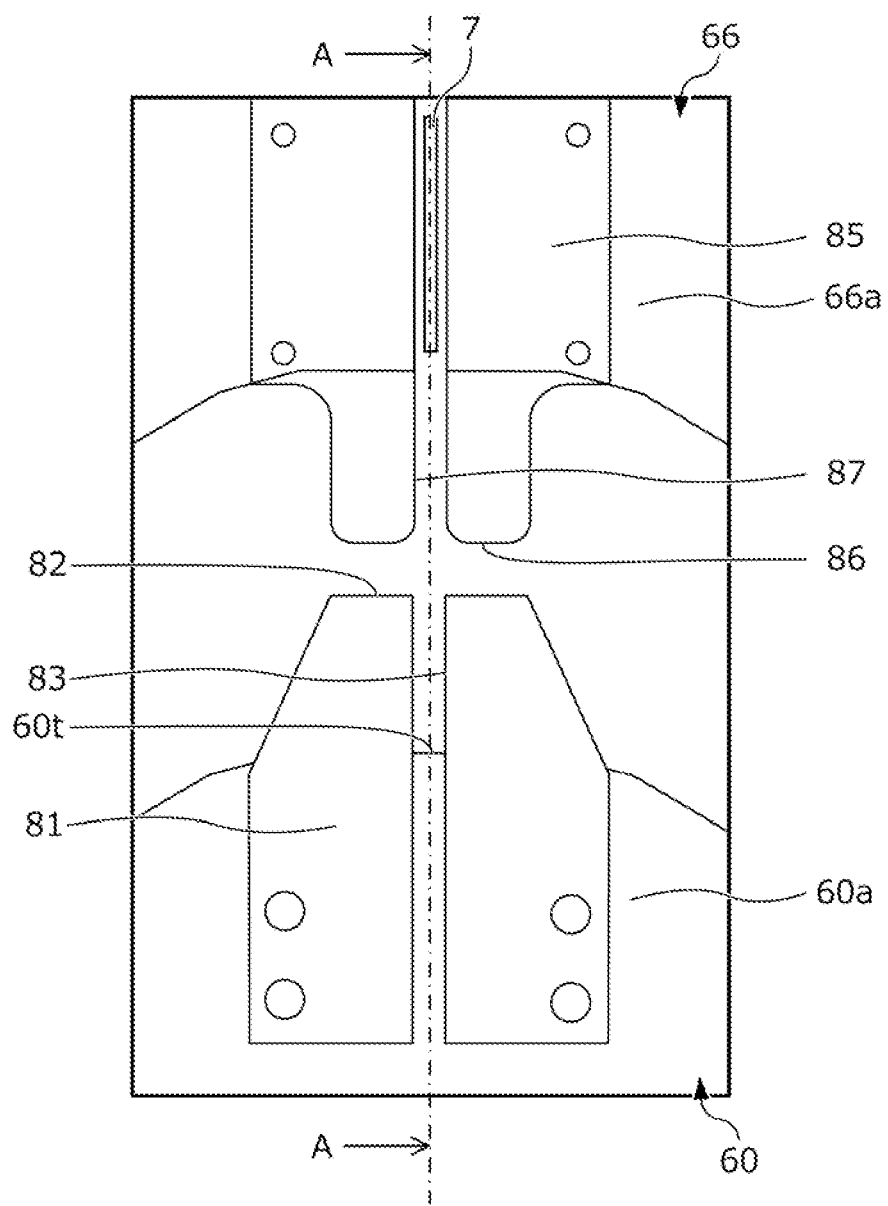
FIG. 11A is a side view of a first positioning portion.
Figure 11B:
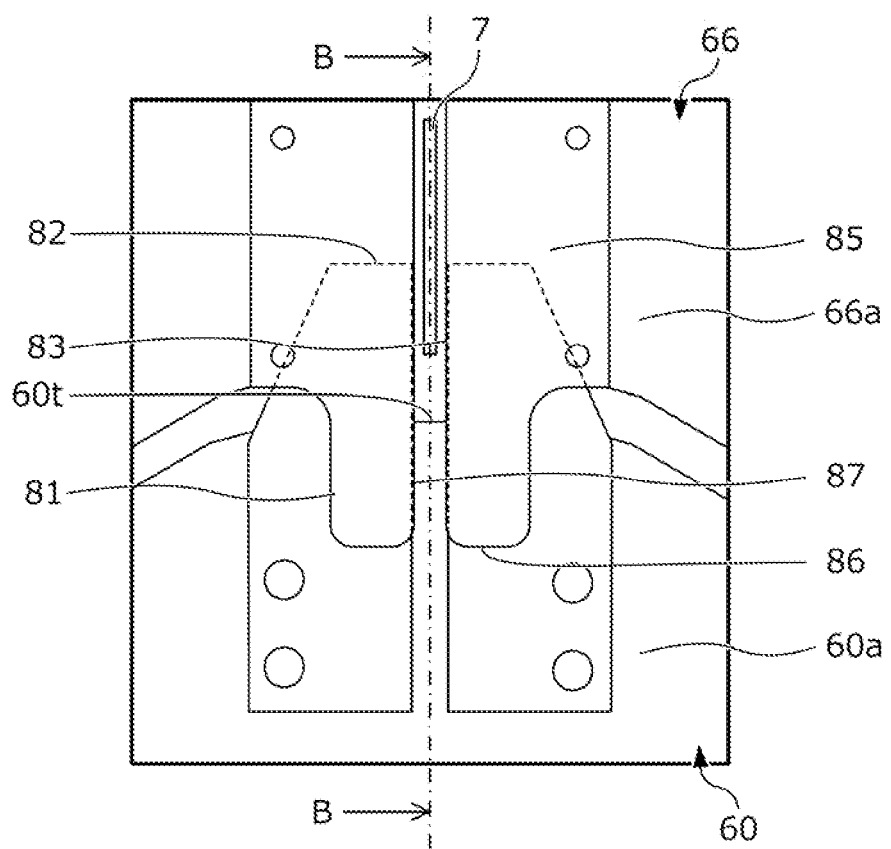
FIG. 11B is a side view of the first positioning portion when a lower die and an upper die are clamped together.

FIG. 11A is a side view of the first positioning portion 8. FIG. 11B is a side view of the first positioning portion 8 when the lower die 60 and the upper die 66 are clamped together.

As illustrated in FIGS. 10 and 11A, the first lower plate 81 has a plate shape extending toward the upper die 66, and is provided outside the first lower die end 60a so as to be substantially parallel to the first lower die end 60a of the lower die 60. The first lower plate 81 is fixed to the first lower die end 60a of the lower die 60 such that an upper end portion 82 on the upper die 66 side of the first lower plate 81 is disposed at a higher position along the Z-direction than the lower die ridge line 60t of the lower die 60. In this manner, a case will be described below where the first lower plate 81 is fixed to the lower die 60. However, the present invention is not limited to this configuration. The first lower plate 81 may be erected near the first lower die end 60a of the lower die 60 in the same manner as the first bending post 67. The first lower plate 81 is formed with a slit-shaped first lower guide portion 83 along the cut plane 71 of the trim blade 7.

The first upper plate 85 has a plate shape extending toward the lower die 60 and the above-described first lower plate 81, and is provided outside the first upper die end 66a on the positive side in the Y-direction in a side view along the X-direction of the upper die 66 so as to be substantially parallel to the first lower plate 81. Also, the first upper plate 85 is fixed to the first upper die end 66a of the upper die 66 and is reciprocatively movable together with the upper die 66. Note that, a case will be described below where the first upper plate 85 is provided outside the first lower plate 81. However, the present invention is not limited to this configuration. The first upper plate 85 may be provided inside the first lower plate 81.

As illustrated in FIG. 11B, the first upper plate 85 is fixed to the upper die 66 such that a lower end portion 86 on the lower die 60 side of the first upper plate 85 is lower in height along the Z-direction than the upper end portion 82 of the first lower plate 81 when the lower die 60 and the upper die 66 are clamped together. Accordingly, at least portions of the first lower plate 81 and the first upper plate 85 overlap with each other when the lower die 60 and the upper die 66 are clamped together, and a portion including the upper end portion 82 of the first lower plate 81 is hidden inside the first upper plate 85.

The first upper plate 85 is formed with a slit-shaped first upper guide portion 87 along the cut plane 71 of the trim blade 7. As illustrated in FIG. 11B, the first upper guide portion 87 and the first lower guide portion 83 formed on the first lower plate 81 overlap with each other in a side view along the Y-direction when the lower die 60 and the upper die 66 are clamped together. Accordingly, the trim blade 7 moves along the first lower guide portion 83 and the first upper guide portion 87 after the lower die 60 and the upper die 66 are clamped together, which makes it possible to cut the first excess edge portion 25 positioned by the first lower plate 81 and the first upper plate 85.

Returning to FIG. 8, the second positioning portion 9 includes the second lower plate 91 and the second upper plate 95 provided on either side of the second excess edge portion 26 of the sheet material 2, on the outside of the second lower die end 60b of the lower die 60 (i.e., on the second bending post 68 side of the second lower die end 60b). The second positioning portion 9 positions the second excess edge portion 26 by sandwiching a portion of the second excess edge portion 26 intersecting the cut plane 71 of the trim blade 7 between the lower plate 91 and the upper plate 95 when the lower die 60 and the upper die 66 are clamped together. The configurations of the second lower plate 91 and the second upper plate 95 are substantially the same as those of the above-described first lower plate 81 and first upper plate 85, and thus illustration and a detailed description thereof are omitted.

Next, the process of a forming method using the forming system 1 described above will be described.

Figure 12:
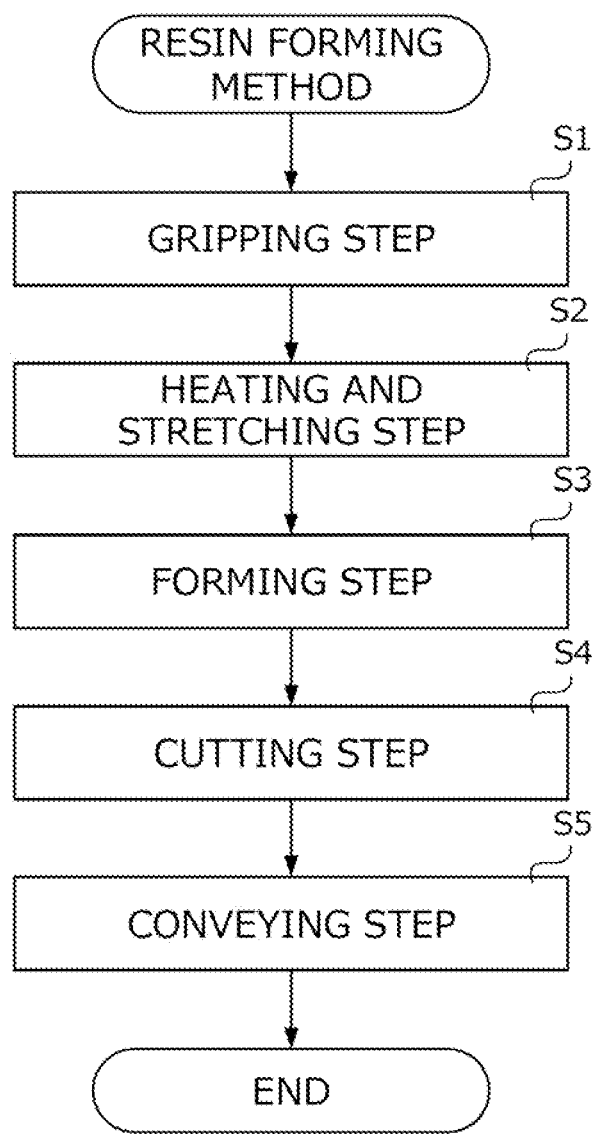
FIG. 12 is a flowchart illustrating a detailed process of a forming method according to the present embodiment.

FIG. 12 is a flowchart illustrating a detailed process of a resin forming method. First, in a gripping step S1, the sheet supplying unit 4 uses the sheet transfer mechanism 41 to make the gripping frame 30 of the gripping device 3 grip one new sheet of the sheet material 2 and then conveys the gripping device 3 to the heating device 5. Specifically, the Y side end portions 23Y, 24Y of the sheet material 2 are gripped by the Y end clamps of the Y side members 33, 34 of the gripping frame 30, and the X side end portions 21X, 22X of the sheet material 2 are gripped by the clamp units 311, 312 of the first X side member 31 of the gripping frame 30 and the clamp units 321, 322 of the second X side member 32. As described with reference to FIG. 4B, the sheet supplying unit 4 is provided with the clamp cylinder 42. Here, in the gripping step S1, by the base end portions of the clamp levers of the clamp units 311, 312, 321, 322 being pushed downward in the Z-direction by the clamp cylinders 42, the sheet material 2 is gripped by the clamp units 311, 312, 321, 322.

Next, in a heating and stretching step S2, the heating device 5 heats and stretches the sheet material 2 gripped by the gripping frame 30 of the gripping device 3. Also, in the heating and stretching step S2, by the gripping device 3 driving the X-axis actuators 395, 396 and the Y-axis actuators 397, 398, the sheet material 2 softened by heating via the heating device 5 is stretched in the X-direction and the Y-direction (see FIGS. 5A and 5B and FIGS. 6A and 6B described above), and then the gripping device 3 is conveyed to the forming device 6. Note that in the heating and stretching step S2, the sheet material 2 may be stretched in both of the X-direction and the Y-direction, may be stretched only any one of the X-direction and the Y-direction, or may not be stretched in either of the X-direction and the Y-direction. That is, the stretching step is not an essential step.

Next, in a forming step S3, the sheet material 2 after the heating and stretching step S2 is disposed between the lower die 60 and the upper die 66, the lower die 60 and the upper die 66 are clamped together, the sheet material 2 is adhered to the base materials 63, 64 as a skin, and a product is manufactured. Specifically, in the forming step S3, the gripping device 3 after the heating and stretching step S2 is lowered downward in the Z-direction by the lowering device 65, and the sheet material 2 gripped by the gripping frame 30 is brought toward the lower die 60. Thereafter, the lower die 60 and the upper die 66 are clamped together, and a suction device (not illustrated) is used to suction a gas from the lower die surfaces 61a, 62a and the upper die surfaces 661a, 662a. This adheres the sheet material 2 to the base materials 63, 64.

Figure 13:
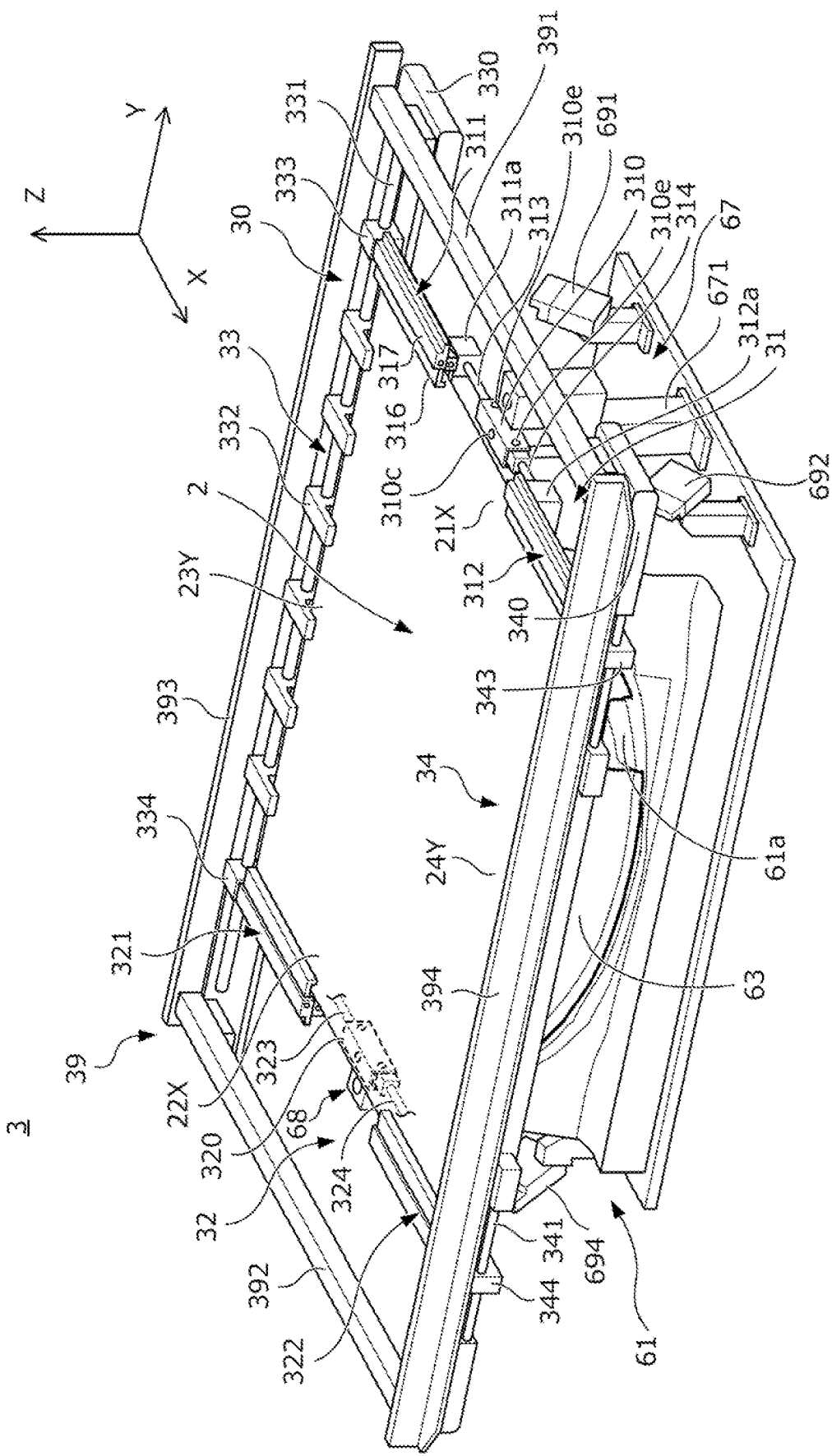
FIG. 13 is a diagram illustrating the process of lowering the gripping device in a forming step (1 of 2)
Figure 14:
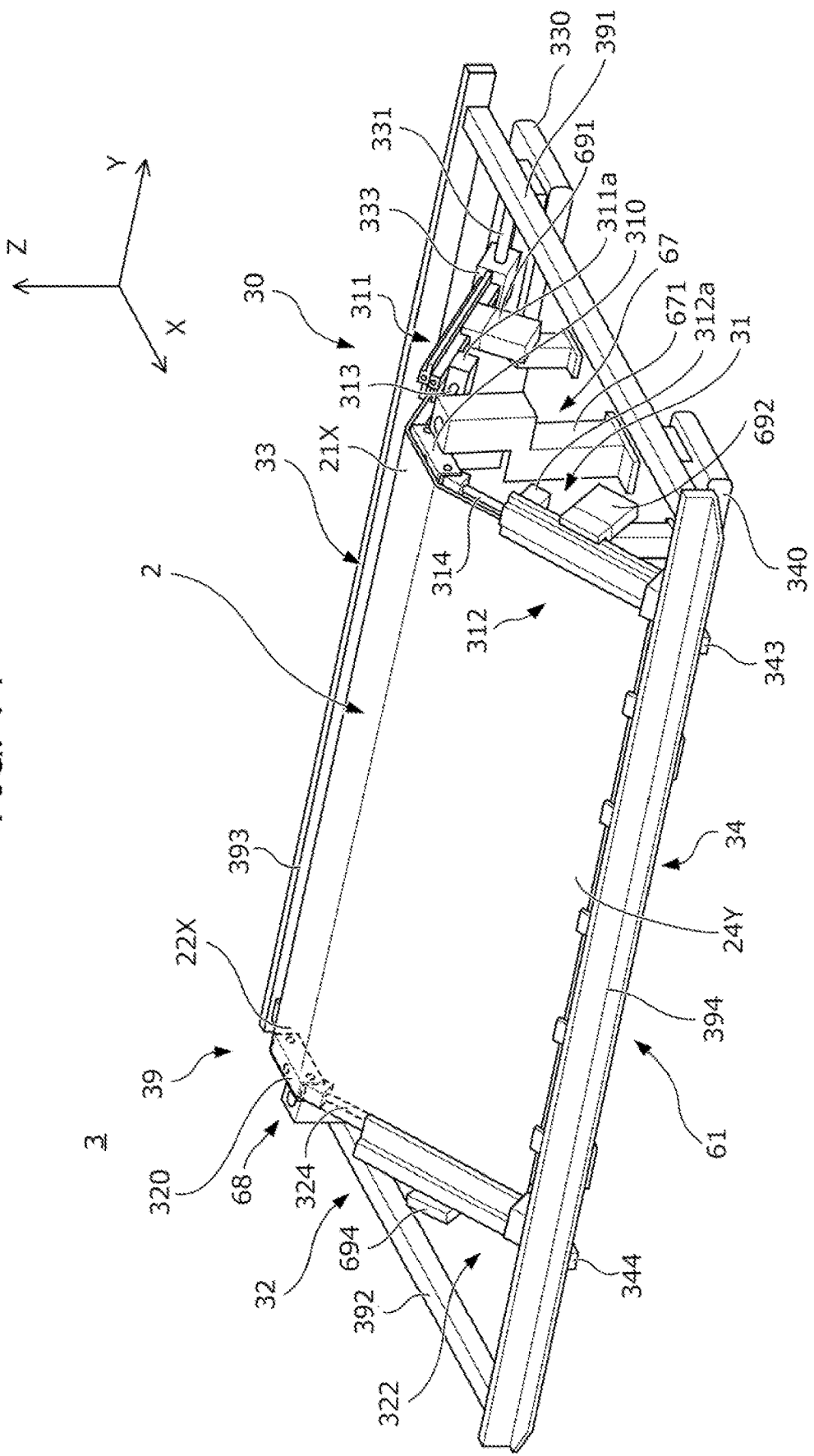
FIG. 14 is a diagram illustrating the process of lowering the gripping device in a forming step (2 of 2)

Next, the process of lowering the gripping device 3 in the forming step S3 will be described in detail with reference to FIGS. 8 to 9, and 13 to 14. FIGS. 13 and 14 are diagrams illustrating a process of lowering the gripping device 3. Note that also in FIGS. 13 and 14, to facilitate understanding, the second lower die 62 is omitted.

First, in the forming step S3, a conveying device (not illustrated) conveys the gripping device 3 between the lower die 60 and the upper die 66, the gripping device 3 gripping the sheet material 2 as illustrated in FIG. 9. Specifically, the conveying device conveys the gripping device 3 between the lower die 60 and the upper die 66 such that the first lower plate 81 and the first upper plate 85 and the second lower plate 91 and the second upper plate 95 are disposed inside the edge sides of the sheet material 2 gripped by the gripping frame 30 in plan view as illustrated in FIG. 8.

Next, as illustrated in FIG. 13, the lowering device 65 lowers the fixing frame 39 of the gripping device 3 downward in the Z-direction until the bending portions 310, 320 of the gripping frame 30 come into contact with the tip portions of the bending posts 67, 68. Specifically, the lowering device 65 lowers the fixing frame 39 in the Z-direction until the bending post pins 672, 682 provided on the tip portions of the bending posts 67, 68 are inserted into the guide holes formed in the bending portions 310, 320 and until the post contact surfaces of the bending portions 310, 320 come into contact with the tip surface of the bending posts 67, 68.

Note that as described with reference to FIG. 3, the guide holes of the bending portions 310, 320 and the bending post pins 672, 682 are formed with a tapered surface. Thus, even in a case where the position of the gripping device 3 in relation to the bending posts 67, 68 or the lower dies 61, 62 is offset from the correct position, the gripping device 3 can be positioned at the correct position, allowing the bending portions 310, 320 to be inserted on the bending post pins 672, 682. In this manner, by the gripping device 3 being aligned in relation to the bending posts 67, 68 and the lower dies 61, 62, the sheet material 2 gripped by the gripping frame 30 of the gripping device 3 can be adhered on the base materials 63, 64 placed in the lower dies 61, 62 consistently at the same position, improving the quality of the product.

Next, as illustrated in FIG. 14, the lowering device 65 lowers the fixing frame 39 of the gripping device 3 further downward in the Z-direction. As described with reference to FIG. 3, the first X side member 31 and the second X side member 32 of the gripping frame 30 can freely bend at ends on both sides in the X-direction of the bending portions 310, 320. Thus, after the bending portions 310, 320 have come into contact with the tip portion of the bending posts 67, 68 and the fixing frame 39 is further lowered, as illustrated in FIG. 14, the first X side member 31 and the second X side member 32 bend at ends on both sides of the bending portions 310, 320.

Also, as described with reference to FIGS. 5A and 5B, the first base portion 330 and the second base portion 340 to which the first X side member 31 and the second X side member 32 are joined at both end portions can freely slide in the X-direction along the fixing frame 39. Thus, when the fixing frame 39 of the gripping device 3 is lowered by the lowering device 65, the first base portion 330 and the second base portion 340 slide toward one another in the X-direction via the tension of the sheet material 2. Then, as illustrated in FIG. 14, the first X side member 31 and the second X side member 32 bend at both sides of the bending portions 310, 320 and protrude upward as seen along the Y-direction.

Also, when the fixing frame 39 is lowered in this manner, the central portion in the X-direction of the X side end portions 21X, 22X of the sheet material 2 gripped by the side members 31, 32 are brought into contact with the sheet contact surface of the bending portions 310, 320. This also bends the sheet material 2 at the ends on both sides of the bending portions 310, 320, making it protrude upward as seen along the Y-direction. In this manner, in the forming step S3, simply by lowering the fixing frame 39 of the gripping device 3 via the lowering device 65, the sheet material 2 can be bent in a shape corresponding to the protrusion shape of the lower die surfaces 61a, 62a.

Accordingly, in the present embodiment, by bending the gripping frame 30 gripping the four side end portions 21X, 22X, 23Y, 24Y of the planar-shaped sheet material 2, the sheet material 2 is bent to protrude upward. This allows the sheet material 2 to be stretched uniformly at all portions in the planar direction and allows the thickness of the sheet material 2 at all portions to be made uniform. This further improves the quality of the product.

Figure 15:
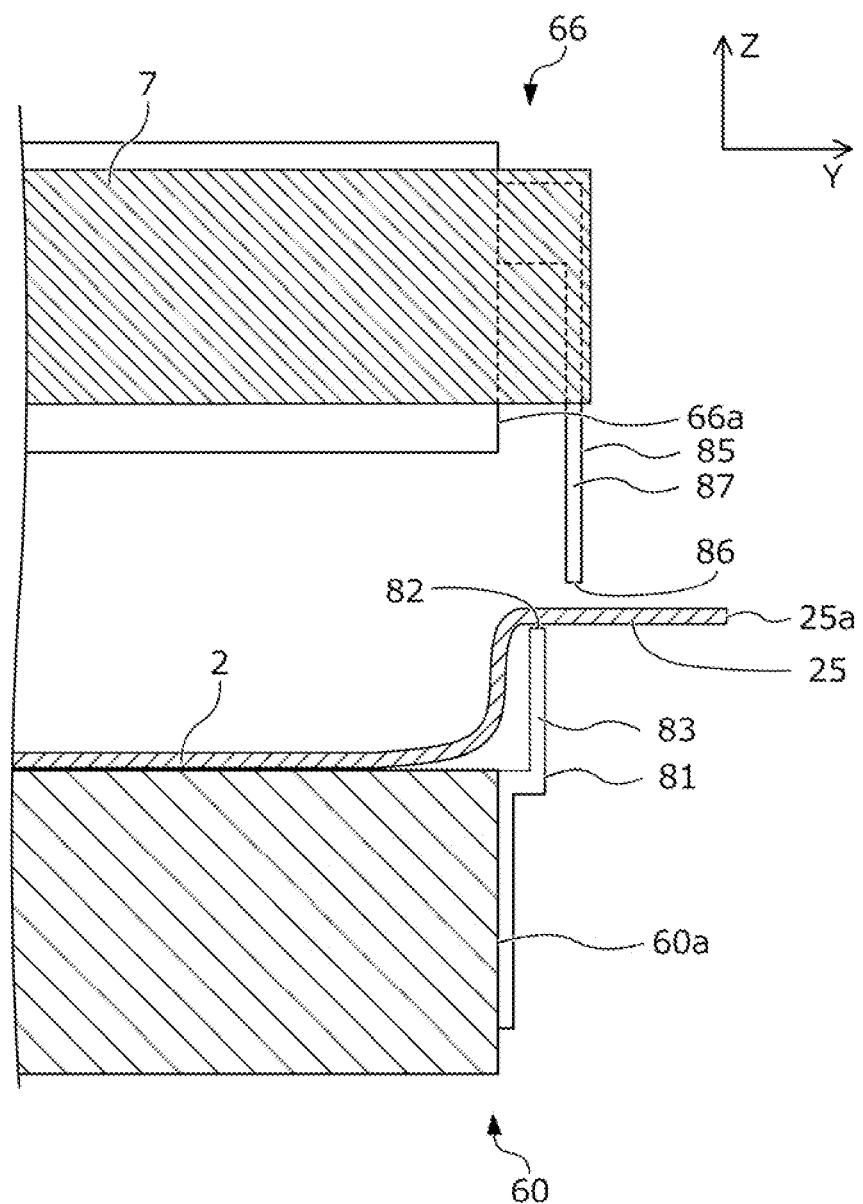
FIG. 15 is a cross-sectional view of the first positioning portion taken along line A-A of FIG. 11A.

FIG. 15 is a cross-sectional view of the first positioning portion 8 taken along line A-A of FIG. 11A. Specifically, FIG. 15 is a cross-sectional view of the first positioning portion 8 when the gripping device 3 is lowered to the lower die 60 as illustrated in FIG. 14.

As described above, in the forming step S3, the sheet material 2 is disposed between the lower die 60 and the upper die 66 such that the first lower plate 81 and the first upper plate 85 are disposed inside the edge side 25a of the first excess edge portion 25 in plan view. When the gripping device 3 is lowered to the lower die 60, the sheet material 2 is in a state of being engaged with the upper end portion 82 of the first lower plate 81 in the first excess edge portion 25, as illustrated in FIG. 15. Note that in this state, the edge side 25a of the first excess edge portion 25 is outside the cut plane 71 of the trim blade 7.

Also, in the forming step S3, after the sheet material 2 is brought toward the lower die 60 in this manner, the lower die 60 and the upper die 66 are clamped together, and a suction device (not illustrated) is used to suction a gas from the lower die surfaces 61a, 62a and the upper die surface 66a. This adheres the sheet material 2 to the base materials 63, 64.

Figure 16:
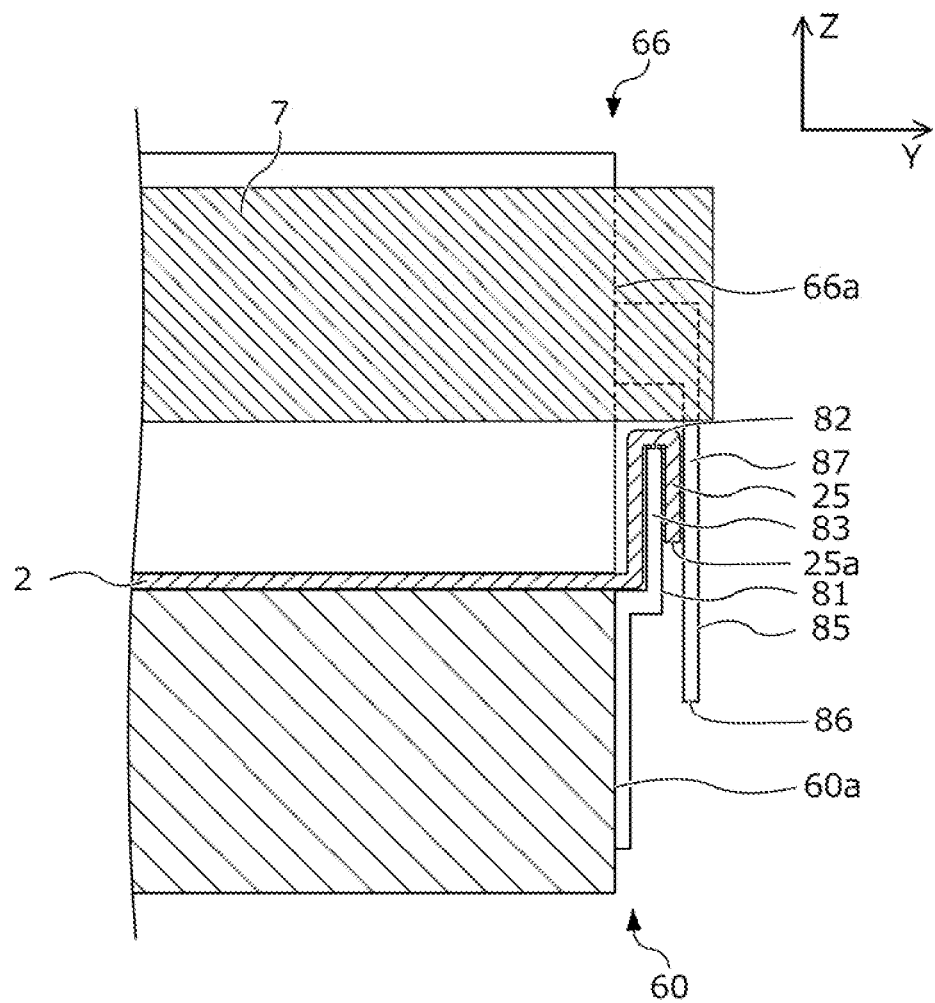
FIG. 16 is a cross-sectional view of the first positioning portion taken along line B-B of FIG. 11B.
Figure 17:
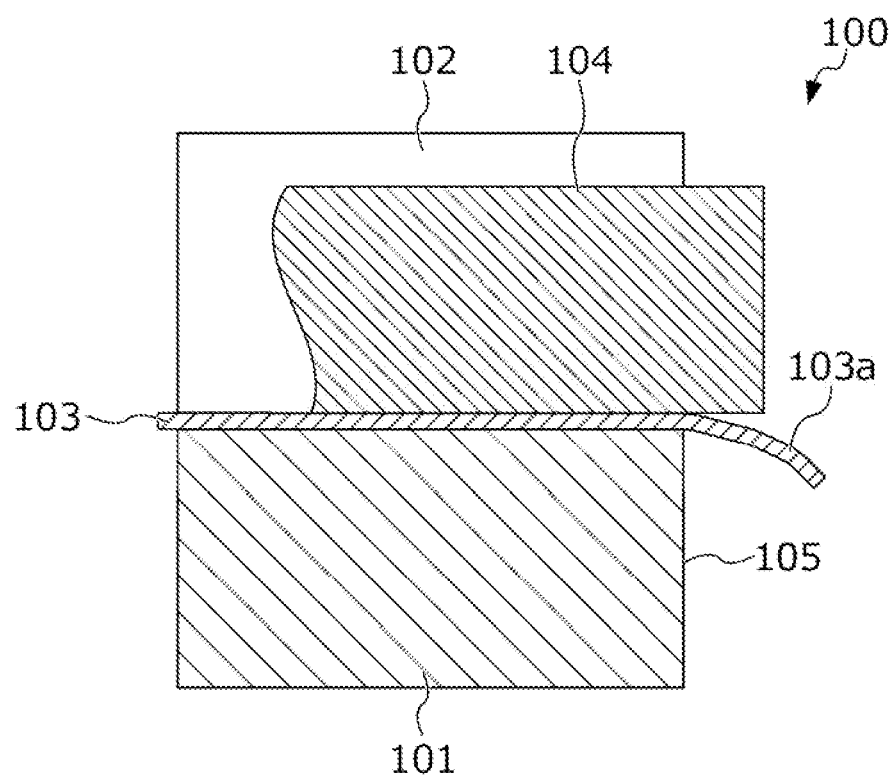
FIG. 17 is a diagram schematically illustrating a forming device provided with a trim blade for cutting a sheet material after a lower die and an upper die are clamped together, in a conventional forming device.

FIG. 16 is a cross-sectional view of the first positioning portion 8 taken along line B-B of FIG. 11B. Specifically, FIG. 16 is a cross-sectional view of the first positioning portion 8 when the lower die 60 and the upper die 66 are clamped together from the state illustrated in FIG. 15.

As illustrated in FIG. 16, when the upper die 66 is brought toward the lower die 60 from the state illustrated in FIG. 15, and the first upper plate 85 is lowered toward the first lower plate 81 in the Z-direction, the lower end portion 86 of the first upper plate 85 comes into contact with the first excess edge portion 25 of the sheet material 2. When the upper die 66 is further brought toward the lower die 60, the edge side 25a is drawn into between the first lower plate 81 and the first upper plate 85, and the first excess edge portion 25 is folded. Thus, in the state where the lower die 60 and the upper die 66 are clamped together, the portion of the first excess edge portion 25 intersecting the cut plane 71 of the trim blade 7 including the edge side 25a is sandwiched between the first lower plate 81 and the first upper plate 85, as illustrated in FIG. 16. In this manner, the first excess edge portion 25 is positioned by the first lower plate 81 and the first upper plate 85 in a state where the edge side 25a of the first excess edge portion 25 is within a range of the cut plane 71 of the trim blade 7.

Although illustration and a detailed description thereof are omitted, the lower die 60 and the upper die 66 are clamped together via the process described above, and the second excess edge portion 26 of the sheet material 2 is positioned by the second lower plate 91 and the second upper plate 95 of the second positioning portion 9 via the same process as the first excess edge portion 25.

Note that as illustrated in FIG. 14, when the fixing frame 39 is lowered by the lowering device 65, the clamp units 311, 312 for gripping the first X side end portion 21X of the sheet material 2 and the clamp units 321, 322 for gripping the second X side end portion 22X are disposed opposing the unclamp units 691, 692, 693, 694. Thus, in the forming step S3, after the sheet material 2 is adhered to the base materials 63, 64 via the process described above, the clamp levers of the clamp units 311, 312, 321, 322 are pushed upward in the Z-direction by the unclamp units 691, 692, 693, 694, releasing the grip of the clamp units 311, 312, 321, 322 on the sheet material 2.

In this manner, in the present embodiment, by the unclamp units 691 to 694 for releasing the grip of the gripping device 3 on the sheet material 2 being provided near the lower dies 61, 62 as a separate member to the gripping device 3, the unclamp units 691 to 694 can be kept at normal temperatures at all times. In other words, it is conceivable to provide the unclamp units on the gripping device 3. However, in this case, the gripping device 3 is heated by the heating device 5 along with the sheet material 2. In contrast, according to the present embodiment, the unclamp units 691 to 694 can be kept at normal temperatures at all times as described above. Thus, the unclamp units 691 to 694 can be prevented from damage and deformation due to heat.

Returning to FIG. 12, in a cutting step S4, the lower die 60 and the upper die 66 are clamped together as described above, the trim blade 7 is moved toward the lower die 60 in the Z-direction in the state in which the first excess edge portion 25 and the second excess edge portion 26 are positioned by the first positioning portion 8 and the second positioning portion 9 such that the cut plane 71 of the trim blade 7 intersects both the excess edge portions 25, 26 of the sheet material 2, and the sheet material 2 is cut. When the lower die 60 and the upper die 66 are clamped together as described above, the first excess edge portion 25 is sandwiched between the first lower plate 81 and the first upper plate 85, and the second excess edge portion 26 is sandwiched between the second lower plate 91 and the second upper plate 95. At this time, both of the edge side 25a of the first excess edge portion 25 and the edge side 26a of the second excess edge portion 26 are drawn within a range of the cut plane 71 of the trim blade 7. Thus, in a cutting step S4, by moving the trim blade 7 along the cut plane 71, the sheet material 2 can be divided into two of the first product portion to which the first base material 63 is adhered and the second product portion to which the base material 64 is adhered.

In a conveying step S5, the conveying device (not illustrated) conveys the gripping device 3 after releasing the grip of the sheet material 2 from the forming device 6 to the sheet supplying unit 4. Specifically, in the conveying step S5, the conveying device returns the gripping frame 30 having stretched out in the X-direction and the Y-direction in the heating and stretching step S2 to its original position and conveys the gripping device 3 to the sheet supplying unit 4.

Note that in the embodiment described above, the pair of bending posts 67, 68 erected near the lower dies 61, 62 are used as the pair of bending support portions where the first bending portion 310 and the second bending portion 320 of the gripping frame 30 of the gripping device 3 make contact. However, the present invention is not limited to this configuration. As the pair of bending support portions that bend the gripping frame 30 when the pair of bending portions 310, 320 of the gripping frame 30 come into contact, for example, a portion of the lower dies may be used, or a portion of a device separate from the forming device may be used.

According to the forming system 1 and the forming method according to the present embodiment, the following effects can be achieved.

(1) The forming system 1 includes the trim blade 7 for cutting off the sheet material 2, the lower plates 81, 91 provided outside the lower die ends 60a, 60b in a side view along the X-direction of the lower die 60 and extending toward the upper die 66, and the upper plates 85, 95 provided outside the upper die end in a side view along the X-direction of the upper die 66, configured to reciprocatively move together with the upper die 66 and extending toward the lower plate 81, 91. In the forming system 1, the cut plane 71 of the trim blade 7 (i.e., a plane formed by the cutting edge of the trim blade 7 when the trim blade 7 is moved within a movable range) intersects the excess edge portions 25, 26 of the sheet material 2, and at least portion of the excess edge portions 25, 26 is positioned by being sandwiched between the lower plates 81, 91 and the upper plates 85, 95 in a state in which the lower die 60 and the upper die 66 are clamped together. According to the forming system 1, when the trim blade 7 is moved within the movable range, the excess edge portions 25, 26 of the sheet material 2 can be prevented from escaping outward of the cut plane 71 of the trim blade 7, which makes it possible to prevent cutting failure of the sheet material 2.

(2) In the forming system 1, by positioning the excess edge portion 25 of the sheet material 2 by the lower plate 81 and the upper plate 85 having the slit-shaped lower guide portion 83 and the slit-shaped upper guide portion 87 extending along the cut plane 71 of the trim blade 7, the excess edge portion 25 can be reliably prevented from escaping outward of the cut plane 71 when the trim blade 7 is moved, which makes it possible to reliably prevent the cutting failure of the sheet material 2.

(3) According to the forming system 1, by cutting off a portion including the excess edge portion 25 of the sheet material 2 by the trim blade 7 in a state in which a portion of the excess edge portion 25 of the sheet material 2 intersecting the cut plane 71 of the trim blade 7 is positioned by the lower plate 81 and the upper plate 85, the sheet material 2 can be divided into the first product portion to which the first base material 63 is adhered and the second product portion to which the second base material 64 is adhered.

(4) According to the forming system 1, by gripping at least a portion of the edge side 25a of the sheet material 2 by the gripping frame 30 such that the lower plate 81 and the upper plate 85 are located inside the edge side 25a of the excess edge portion 25 of the sheet material 2 in plan view between the lower die 60 and the upper die 66, a portion of the excess edge portion 25 of the sheet material 2 intersecting the cut plane 71 can be reliably sandwiched between the lower plate 81 and the upper plate 85 when the lower die 60 and the upper die 66 are clamped together. Thus, the excess edge portion 25 of the sheet material 2 can be reliably prevented from escaping outward of the cut plane 71 of the trim blade 7 when the trim blade 7 is moved within a movable range, which makes it possible to reliably prevent the cutting failure of the sheet material 2.

(5) The forming method according to the present embodiment includes the forming step including disposing the sheet material 2 between the lower die 60 and the upper die 66 and clamping together the lower die 60 and the upper die 66; and the cutting step including cutting off the sheet material 2 by moving the trim blade 7 after the lower die 60 and the upper die 66 are clamped together. In the cutting step, the sheet material 2 is cut off in a state in which the excess edge portions 25, 26 of the sheet material 2 is positioned in such a manner as to intersect the cut plane 71 of the trim blade 7. According to the forming method, when the trim blade 7 is moved within the movable range, the excess edge portions 25, 26 of the sheet material 2 can be prevented from escaping outward of the cut plane 71 of the trim blade 7, which makes it possible to prevent cutting failure of the sheet material 2.

(6) In the forming method according to the present embodiment, by positioning the excess edge portions 25, 26 of the sheet material 2 by sandwiching the sheet material 2 between the lower plates 81, 91 and the upper plates 85, 95 extending in the direction in which the upper die 66 reciprocatively moves, the excess edge portions 25, 26 can be reliably prevented from escaping outward of the cut plane 71 when the trim blade 7 is moved, which makes it possible to reliably prevent the cutting failure of the sheet material 2.

(7) According to the forming method of the present embodiment, by cutting off a portion including the excess edge portions 25, 26 of the sheet material 2 by the trim blade 7 in a state in which a portions of the excess edge portions 25, 26 of the sheet material 2 intersecting the cut plane 71 of the trim blade 7 is positioned by the positioning portions 8, 9, the sheet material 2 can be divided into the first product portion to which the first base material 63 is adhered and the second product portion to which the second base material 64 is adhered.

(8) According to the forming method of the present embodiment, by gripping at least a portion of the edge sides 25a, 25b of the sheet material 2 by the gripping frame 30 such that the lower plates 81, 91 and the upper plates 85, 95 are located inside the edge sides 25a, 25b of the sheet material 2 in plan view between the lower die 60 and the upper die 66, a portion of the excess edge portions 25, 26 of the sheet material 2 can be reliably sandwiched between the lower plates 81, 91 and the upper plates 85, 95 when the lower die 60 and the upper die 66 are clamped together. Thus, the excess edge portions 25, 26 of the sheet material 2 can be reliably prevented from escaping outward of the cut plane surface 71 of the trim blade 7 when the trim blade 7 is moved within the movable range, which makes it possible to reliably prevent the cutting failure of the sheet material 2.

While one embodiment of the present invention has been described above, the present invention is not limited to this. Detailed configurations may be changed as appropriate within a scope of gist of the present invention.

What is claimed is:
1. A forming system, comprising:
a lower die;
an upper die reciprocatively movable toward and away from the lower die;
a trim blade for cutting a sheet material provided between the lower die and the upper die;

a lower plate provided outside an end of the lower die in a side view of the lower die and extending toward the upper die; and an upper plate provided outside an end of the upper die in a side view of the upper die, the upper plate configured to reciprocatively move together with the upper die and extending toward the lower plate, wherein a cut plane of the trim blade intersects an excess edge portion of the sheet material extending outside the lower die end, at least a portion of the excess edge portion is sandwiched between the lower plate and the upper plate in a state in which the lower die and the upper die are clamped together, a slit-shaped lower guide portion and a slit-shaped upper guide portion extending along the cut plane are formed in the lower plate and the upper plate, respectively, and the trim blade cuts the excess edge portion by moving in the lower guide portion and the upper guide portion.

2. The forming system according to claim 1, wherein the lower die includes a first lower die surface on which a first base material is placed, and a second lower die surface on which a second base material is placed, each of the first and second base materials is adhered to the sheet material by clamping together the lower die and the upper die, and the trim blade cuts the sheet material between the first lower die surface and the second lower die surface in plan view to thereby divide the sheet material into a first product portion to which the first base material is adhered and a second product portion to which the second base material is adhered.

3. The forming system according to claim 1, further comprising:

a frame body that grips at least a portion of an edge side of the sheet material such that the lower plate and the upper plate are located inside the edge side in plan view between the lower die and the upper die.

4. A forming method for forming a product by the forming system according to claim 1, the method comprising:

a forming step including disposing the sheet material between the lower die and the upper die and clamping together the lower die and the upper die; and a cutting step including cutting the sheet material by moving the trim blade after the lower die and the upper die are clamped together, wherein in the cutting step, the sheet material is cut in a state in which at least a portion of the excess edge portion thereof is positioned in such a manner as to intersect the cut plane of the trim blade.

5. The forming method according to claim 4, wherein in the cutting step, the excess edge portion is positioned by sandwiching at least the portion of the excess edge portion between the lower plate and the upper plate.

6. The forming method according to claim 5, wherein in the forming step, a first base material and a second base material are adhered to the sheet material by clamping together the lower die and the upper die in a state in which the first base material and the second base material are placed on a first lower die surface and a second lower die surface formed on the lower die, respectively, and in the cutting step, the sheet material is cut between the first lower die surface and the second lower die surface in plan view, thereby dividing the sheet material into a first product portion to which the first base material is adhered and a second product portion to which the second base material is adhered.

7. The forming method according to claim 5, wherein in the forming step, the lower die and the upper die are clamped together in a state in which an edge side of the sheet material is gripped by a frame body such that the lower plate and the upper plate are located inside the edge side in plan view between the lower die and the upper die.

8. The forming method according to claim 4, wherein in the forming step, a first base material and a second base material are adhered to the sheet material by clamping together the lower die and the upper die in a state in which the first base material and the second base material are placed on a first lower die surface and a second lower die surface formed on the lower die, respectively, and in the cutting step, the sheet material is cut between the first lower die surface and the second lower die surface in plan view, thereby dividing the sheet material into a first product portion to which the first base material is adhered and a second product portion to which the second base material is adhered.

9. A forming system, comprising:

a lower die;

an upper die reciprocatively movable toward and away from the lower die;

a trim blade for cutting a sheet material provided between the lower die and the upper die;

a lower plate provided outside an end of the lower die in a side view of the lower die and extending toward the upper die; and an upper plate provided outside an end of the upper die in a side view of the upper die, the upper plate configured to reciprocatively move together with the upper die and extending toward the lower plate, wherein a cut plane of the trim blade intersects an excess edge portion of the sheet material extending outside the lower die end, at least a portion of the excess edge portion is sandwiched between the lower plate and the upper plate in a state in which the lower die and the upper die are clamped together, the lower die includes a first lower die surface on which a first base material is placed, and a second lower die surface on which a second base material is placed, each of the first and second base materials is adhered to the sheet material by clamping together the lower die and the upper die, and the trim blade cuts the sheet material between the first lower die surface and the second lower die surface in plan view to thereby divide the sheet material into a first product portion to which the first base material is adhered and a second product portion to which the second base material is adhered.

10. The forming system according to claim 9, further comprising:

a frame body that grips at least a portion of an edge side of the sheet material such that the lower plate and the upper plate are located inside the edge side in plan view between the lower die and the upper die.

11. A forming system, comprising:

a lower die;

an upper die reciprocatively movable in a clamping direction toward and away from the lower die;

a trim blade for cutting a sheet material provided between the lower die and the upper die;

a lower plate provided outside an end of the lower die in a side view of the lower die and extending toward the upper die; and an upper plate provided outside an end of the upper die in a side view of the upper die, the upper plate configured to reciprocatively move together with the upper die and extending toward the lower plate, wherein a cut plane of the trim blade intersects an excess edge portion of the sheet material extending outside the lower die end, and in a state in which the lower die and the upper die are clamped together, a lower end portion of the upper plate is lower than an upper end portion of the lower plate in the clamping direction, and at least an edge side of the excess edge portion is sandwiched between planar portions extended in the clamping direction of the lower plate and the upper plate.

\* \* \* \* \*